US012179428B2

(12) United States Patent
Wiecke et al.

(10) Patent No.: US 12,179,428 B2
(45) Date of Patent: Dec. 31, 2024

(54) MOTION ISOLATION APPARATUS, METHODS, AND SYSTEMS

(71) Applicant: Pantheon Design Ltd., Vancouver (CA)

(72) Inventors: Alex Wiecke, Vancouver (CA); Zhenwei Cao, Vancouver (CA); Logan Nimmo, Vancouver (CA); Casey Wong, Vancouver (CA)

(73) Assignee: PANTHEON DESIGN LTD., Vancouver (CA)

( * ) Notice: Subject to any disclaimer, the term of this patent is extended or adjusted under 35 U.S.C. 154(b) by 211 days.

(21) Appl. No.: 17/826,115

(22) Filed: May 26, 2022

(65) Prior Publication Data

US 2023/0108665 A1   Apr. 6, 2023

Related U.S. Application Data

(60) Provisional application No. 63/246,404, filed on Sep. 21, 2021.

(51) Int. Cl.
| | |
|---|---|
| *B29C 64/25* | (2017.01) |
| *B29C 64/209* | (2017.01) |
| *B29C 64/232* | (2017.01) |
| *B29C 64/236* | (2017.01) |
| *B29C 64/245* | (2017.01) |
| *B33Y 10/00* | (2015.01) |

(52) U.S. Cl.
CPC ............ *B29C 64/25* (2017.08); *B29C 64/209* (2017.08); *B29C 64/232* (2017.08); *B29C 64/236* (2017.08); *B29C 64/245* (2017.08); *B33Y 10/00* (2014.12)

(58) Field of Classification Search
CPC ..... B29C 64/25; B29C 64/209; B29C 64/232; B29C 64/236; B29C 64/245; B29C 64/118; B33Y 10/00; B33Y 30/00
See application file for complete search history.

(56) References Cited

U.S. PATENT DOCUMENTS

| | | | |
|---|---|---|---|
| 2007/0285652 A1* | 12/2007 | Nielsen | H04N 1/1013 356/237.2 |
| 2022/0193996 A1* | 6/2022 | Durand | B29C 64/393 |
| 2022/0297375 A1* | 9/2022 | Gjovik | B29C 64/232 |

OTHER PUBLICATIONS

Pantheon Design. "10X Teaser." YouTube, Jun. 26, 2020, https://www.youtube.com/watch?v=w8R5VVE6yLQ (last accessed Nov. 23, 2022).
Pantheon Design. "Real Time Footage—10X 2020 Fastest Carbon Fiber Composite 3D Printer." YouTube, Jul. 1, 2020, https://www.youtube.com/watch?v=5yIMM1B8Ihl (last accessed Nov. 23, 2022).

* cited by examiner

*Primary Examiner* — Michael M. Robinson

(57) ABSTRACT

Motion isolation apparatus, methods, and systems are disclosed. One example is a motion isolation apparatus comprising a floating frame that maintains an alignment between a 3D printhead and a 3D print surface, the floating frame having a floating frame stiffness; and a structural frame that supports the floating frame and has a structural frame stiffness, the floating frame stiffness being greater than the structural frame stiffness so that the structural frame elastically deflects to dampen oscillating forces applied to the floating frame by the 3D printhead during printing without disrupting the alignment. Related apparatus, methods, and systems also are disclosed.

20 Claims, 15 Drawing Sheets

MOTION ISOLATION APPARATUS, METHODS, AND SYSTEMS

CROSS-REFERENCE TO RELATED APPLICATIONS

This application claims the benefit of priority to U.S. Provisional Patent Application No. 63/246,404 filed Sep. 21, 2021, the entirety of which is hereby incorporated by reference into this application.

TECHNICAL FIELD

Aspects of this disclosure relate generally to motion isolation apparatus, methods, and systems for printers. Some aspects are optimized to realize faster print speeds with three-dimensional "3D" printers.

BACKGROUND

Previously, before computer-aided design or "CAD", creating 3D models involved carving the 3D models from pliable materials (e.g., wood) and/or constructing the 3D models by attaching parts together (e.g., pieces of cardboard or plastic). These processes were labour intensive and often took days if not weeks to complete. Changes or alterations to a final 3D model were often difficult and time consuming, often requiring a new 3D model to be created, costing money and production time. Nobody was satisfied.

In more recent years, technologies like CAD and 3D printing have been utilized in combination to create 3D models with different types of 3D printable materials (e.g., clay, metal, plastic, wood, and the like) often with drastic reductions in production times realized by automating the previously manual processes for production and iteration.

Modem 3D printing processes typically involve using a horizontally movable printer head to print layers of a printable plastic onto a vertically moveable print surface. The printer head may extrude molten plastic onto the print surface by following a computer-controlled design. Known 3D printing processes may include: (1) printing a layer of the plastic onto the print surface with the print head; (2) moving the print surface vertically downwardly from the print head; (3) printing a subsequent layer of the plastic on top of the layer printed in step (1); and repeating steps (1) through (3) with additional layers until a 3D model is printed from the plastic material.

Commercially available 3D printers typically have a 3D printhead movable along a horizontally extending X-Y plane. Some commercially available 3D printers employ a rigid gantry-style motion system for moving the 3D printhead. One example from General CNC Machine Motion Systems is shown in FIG. 1. The Darwin/Ultimaker Cartesian Motion System is shown in FIG. 2 as another example. With these and many other available 3D printers, a rigid gantry is provided so that the 3D printhead is movable along a single horizontal X-axis and the 3D print surface is movable along a perpendicular horizontal Y-axis. The Mendel/i3 Cartesian Motion System is shown in FIG. 3 as one example. Some commercially available 3D printers may move the 3D print surface downwardly as in shown FIGS. 1 and 2 whereas other commercially available 3D printers may move the 3D print surface upwardly as in shown FIG. 3. Still, other commercially available 3D printers may move the 3D printhead horizontally and vertically. The Delta Motion System is shown in FIG. 4 as another example. A rigid gantry is utilized with each of these examples.

Accelerating a 3D printer head in different X-Y and/or -Z directions while printing a 3D model may apply oscillating forces to the structural components such as a rigid gantry. Depending on how the structural components are designed, the oscillating forces may cause deflections of the 3D printhead and/or in the 3D print surface leading to warping of the 3D model. The amount of warping is usually relative to displacements between the 3D printhead and the 3D print surface. For 3D printers with rigid gantries like those shown in FIGS. 1 through 4, relatively slow movements or accelerations of their 3D printheads and/or 3D print surfaces may cause small deflections and minimal warping because their rigid gantries are able to absorb the oscillating forces. For this reason, standard 3D printers typically have maximum travel speeds in the range of 150-400 mm/s and maximum accelerations in the range of 1,000-3,000 mm/s$^2$. For 3D printers with rigid gantries, exponentially faster travel speeds or accelerations of the 3D printheads will typically cause large deflections and significant warping because most rigid gantries are not able to absorb the oscillating forces at faster print speeds.

To counter these limitations, standard gantry 3D printers like those shown in FIGS. 1 through 4 are typically designed to operate at lower print speeds because their rigid gantries simply cannot deal with the above-noted oscillating forces at faster print speeds. From the perspective of mechanical vibrations analysis, most standard gantry 3D printers can be modeled in one dimension as a mass-spring system with one degree of freedom, in which the key variables are: $m_1$, the mass of the gantry, containing the X-Y motion system; $k_1$, spring constant (i.e. stiffness) of the Z-axis and structural frame; $x_1$, the displacement of the gantry; and f(t), the reaction force from accelerating the print head. For simplicity, it may be assumed that the print bed is mounted to the ground and that displacements of the gantry directly result in dimensional errors in the finished part.

In this example, f(t) may be some nonlinear function determined by a motion planner such as a sum of harmonic motions $f(t)=A_1 \cos(\omega_1 t+\phi_1)+A_2 \cos(\omega_2 t+\phi_2)+ \ldots$ and it may be shown that a natural frequency $\omega n_1$ exists such as $\omega_{n1}=k_1/m_1$. For standard gantry 3D printers, a large component of f(t) may oscillate at or near co, when 3D printing at faster print speeds, causing large displacements between the 3D printhead and the 3D print surface, such as when $x_1$ oscillates to a significant degree. These displacements often cause significant warping of the 3D model.

As shown in FIGS. 1-4, the makers of standard gantry 3D printers have attempted to solve these problems with heavier and/or stiffer gantries, including heavy steel frames with overbuilt structural systems for the 3D printhead that are expensive to make and ship. Further improvements are required to make cheaper 3D printers capable of increased print speeds and qualities.

SUMMARY

One aspect of this disclosures is a motion isolation apparatus. For example, the apparatus may comprise a floating frame that maintains an alignment between a 3D printhead and a 3D print surface, the floating frame having a floating frame stiffness; and a structural frame that supports the floating frame and has a structural frame stiffness, the floating frame stiffness being greater than the structural frame stiffness so that the structural frame elastically deflects to dampen oscillating forces applied to the floating frame by the 3D printhead during printing without disrupting the alignment.

The 3D printer attachment plate may comprise horizontal guides that are removably attachable to the 3D printhead and operable to transfer the oscillating forces from the 3D printhead to the floating frame. The horizontal guides may be rigidly attached to the floating frame. The floating frame may comprise an opening sized to receive the 3D printhead. The horizontal guides may be adjacent the opening. The floating frame may comprise vertical guides that are rigidly attached to the floating frame. Top ends of the vertical guides may be rigidly attached to the floating frame with connections that are operable to transfer bending moment forces between the floating frame and the vertical guides. The vertical guides may elastically deflect responsive to the oscillating forces without disrupting the alignment. Bottom ends of the vertical guides may be deflectable relative to the top ends of the vertical guides. A bottom plate may be attached to bottom ends of the vertical guides.

The 3D print surface may be vertically movable between a plurality of different elevations relative to the 3D printhead. The floating frame may be operable to maintain the alignment at each elevation of the plurality of different elevations. The floating frame may comprise vertical guides that are rigidly attached to the floating frame and operable to guide vertical movements of the print surface between the plurality of different elevations. The 3D print surface may comprise sleeves that interact with the vertical guides to guide the vertical movements of the print surface. Exterior surfaces of the vertical guides may interact with interior surfaces of the sleeve to guide the vertical movements.

The 3D print surface may comprise a kinematic mount. The floating frame may be flexibly attached to the structural frame. The floating frame may be rigidly attached to the structural frame. The structural frame may comprise columns that are attached to the floating frame and operable to dampen the oscillating forces by deflecting elastically. Top ends of the columns may be attached to the 3D printer attachment plate with rigid connections operable to transfer bending moment forces to the floating frame. The oscillating forces may generate bending moments causing the columns to deflect elastically. A base plate may be attached to bottom ends of the columns.

Another aspect of this disclosure is a motion isolation method. For example, the method may comprise maintaining, with a floating frame, an alignment between a 3D printhead and a print surface, the floating frame having a floating frame stiffness; and supporting the floating frame with a structural frame having a structural frame stiffness, the floating frame stiffness being exponentially greater than the structural frame stiffness so that the structural frame elastically deflects to dampen oscillating forces applied to the floating frame by the 3D printhead while 3D printing without disrupting the alignment. The method may comprise causing the 3D printhead to apply the oscillating forces. The method may comprise transferring the oscillating forces from the 3D printhead to the floating frame with horizontal guides attached to the floating frame. The floating frame may comprise vertical guides extending downwardly therefrom. Maintaining the alignment may comprise maintaining, with the vertical guides, the alignment between the 3D printer attachment and the print surface.

Yet another aspect of this disclosure is a motion isolation system. For example, the motion isolation system may comprise a motion isolation apparatus comprising a floating frame that maintains an alignment between a 3D printhead and a 3D print surface, the floating frame having a floating frame stiffness; and a structural frame that supports the floating frame and has a structural frame stiffness, the floating frame stiffness being greater than the structural frame stiffness so that the structural frame elastically deflects to dampen oscillating forces applied to the floating frame by the 3D printhead during printing without disrupting the alignment; a plurality of electro-mechanical actuators; and a 3D printer comprising the 3D printhead, wherein the plurality of electro-mechanical actuators are attached to the floating frame and operable to cause movements of the 3D printhead relative to the floating frame.

Additional aspects of motion isolation apparatus, methods, and systems are described below in relation to these and other examples.

BRIEF DESCRIPTION OF THE DRAWINGS

The accompanying drawings, which are incorporated in and constitute part of this disclosure, illustrate exemplary aspects that, together with the written descriptions, serve to explain the principles of this disclosure. Numerous aspects are shown conceptually in the drawings and particularly described, pointed out, and taught in the written descriptions. Some structural and operational aspects may be better understood by referencing the written portions together with the accompanying drawings, of which

Figure 1:
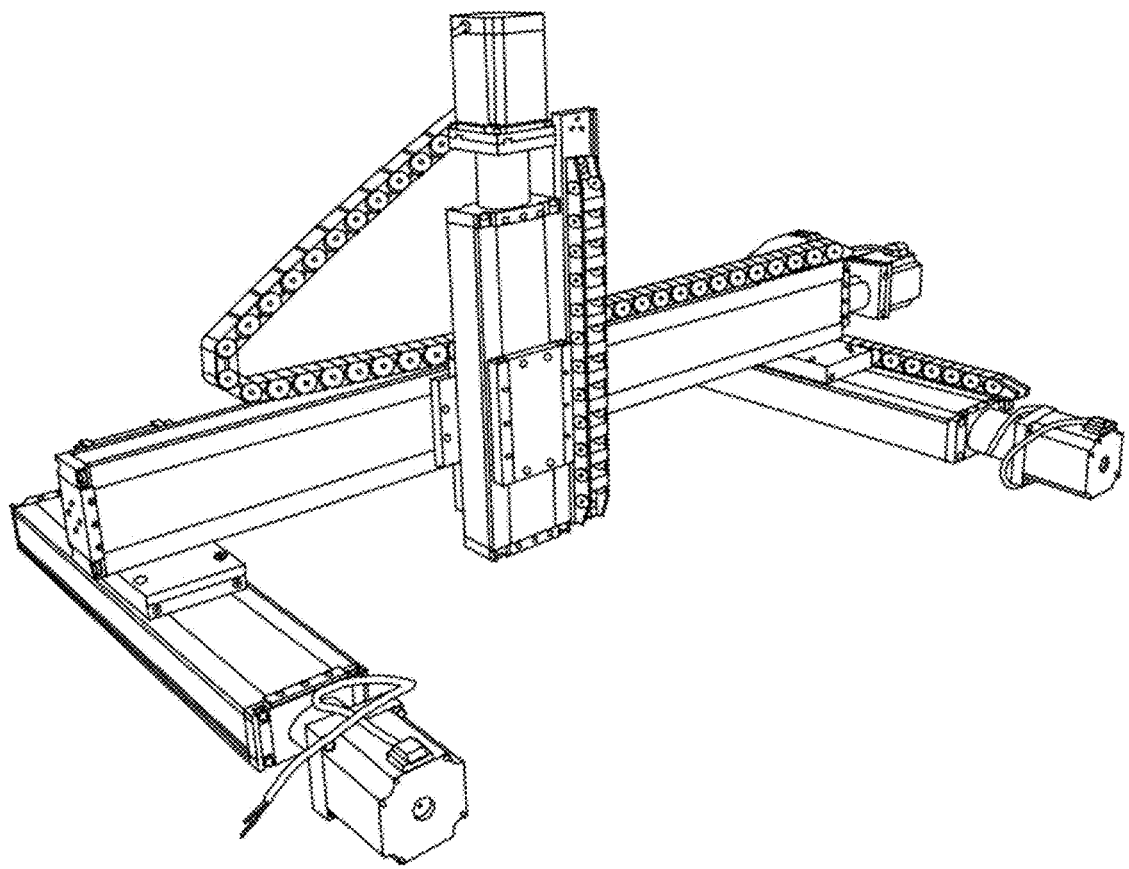
FIG. 1 depicts a known 3D printer with a gantry-style motion system.
Figure 2:
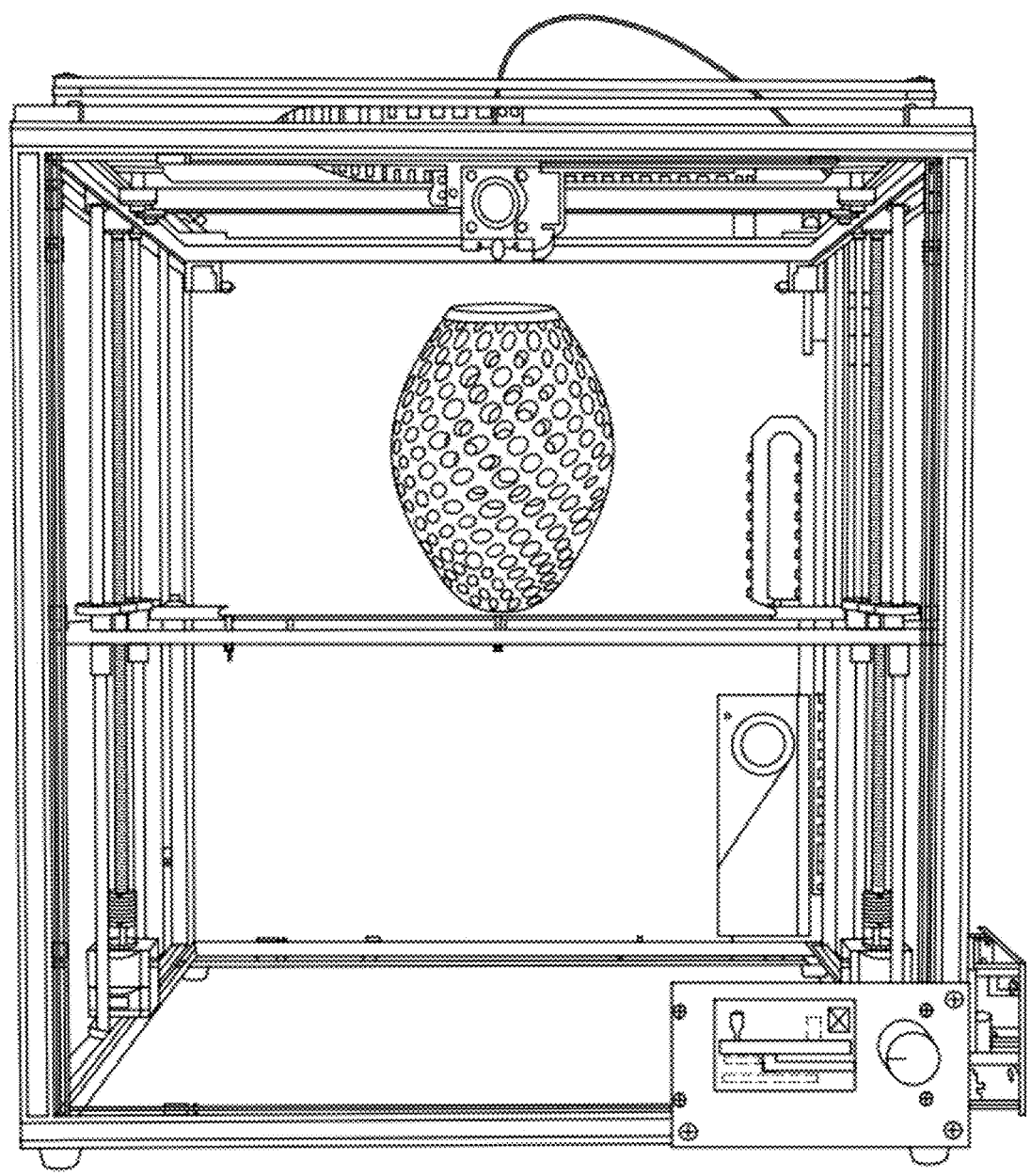
FIG. 2 depicts another known 3D printer with gantry-style motion system.
Figure 3:
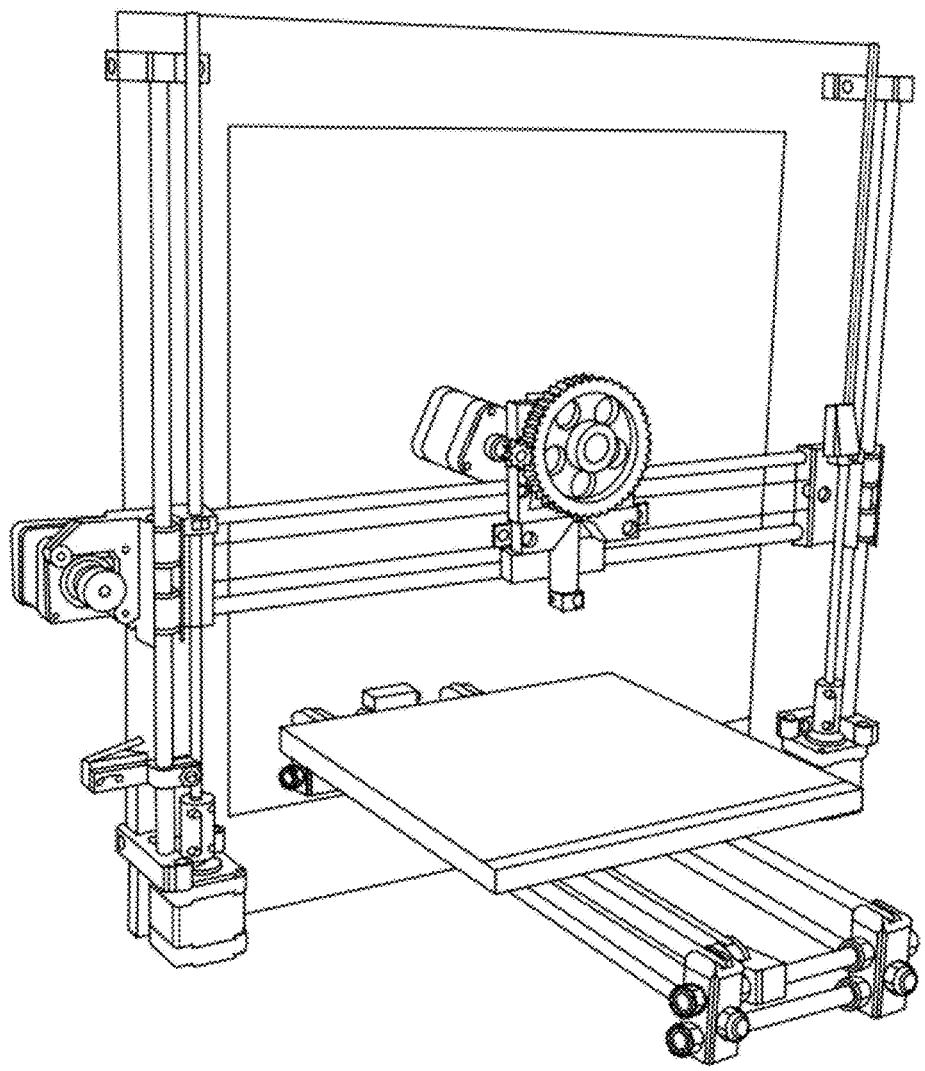
FIG. 3 depicts another known 3D printer with gantry-style motion system.
Figure 4:
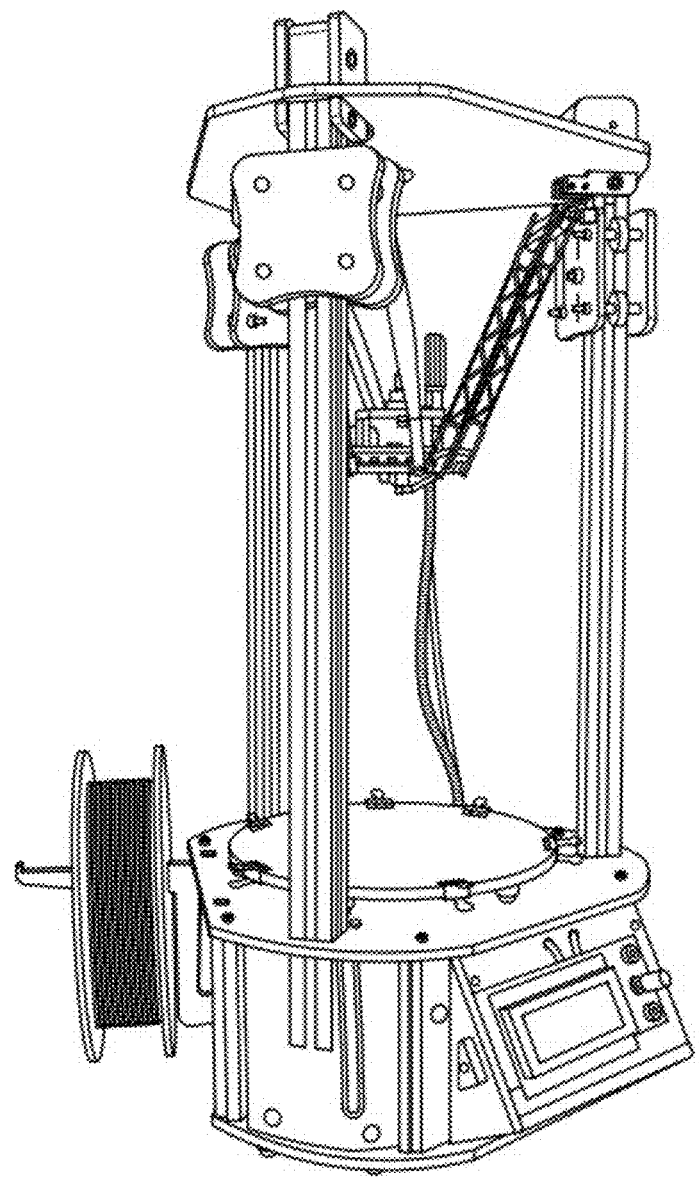
FIG. 4 depicts another known 3D printer with gantry-style motion system.

Aspects of the examples illustrated in the drawings may be explained further by way of citations to the drawing and element numbers in the text of the description. The drawings and any citations thereto are provided for illustration purposes, and to further clarify the description of the present disclosure and are not intended to limit the present disclosure unless claimed.

DETAILED DESCRIPTION

Aspects of the present disclosure are not limited to the exemplary structural details and component arrangements described in this description and shown in the accompanying drawings. Many aspects of this disclosure may be applicable to other aspects and/or capable of being practiced or carried out in various variants of use, including the examples described herein.

Throughout the written descriptions, specific details are set forth to provide a more thorough understanding to persons of ordinary skill in the art. For convenience and ease of description, some well-known elements may be described conceptually to avoid unnecessarily obscuring the focus of this disclosure. In this regard, the written descriptions and accompanying drawings should be interpreted as illustrative rather than restrictive, enabling rather than limiting.

Exemplary aspects of motion isolation apparatus, methods, and systems are described. Some aspects are described with reference to certain movable technologies (e.g., 3D printers), certain forces caused by those technologies (e.g., by moving the printhead of a 3D printer), and certain structures for handling the forces (e.g., a floating frame and a structural frame). Descriptions of these exemplary aspects are provided for convenience to assist the reader and not intended to limit this disclosure unless claimed. Accordingly, any motion isolating technologies described herein with reference to these exemplary aspects may be broadly claimed.

Several exemplary reference axes are described, including a first horizontal axis X-X, a second horizontal axis Y-Y, a vertical axis Z-Z. Some directions, elements, forces, and/or movements are described relative to one or more of these axes. For example, different structural elements may extend horizontally in a plane X-Y or extend vertically along axis Z-Z. Different structural elements may have different and/or irregular cross-sectional shapes dimensions along axis X-X, Y-Y, and/or Z-Z. Some elements may be described as "elongated," meaning that they have a length greater than a width along any one of these axes. These relative terms are provided for convenience to assist the reader and do not limit this disclosure unless claimed.

Inclusive terms such as "comprises," "comprising," "includes," "including," and variations thereof, are intended to cover a non-exclusive inclusion, such that any motion isolation apparatus, methods, and systems described herein, or element(s) thereof described as comprising a list of elements does not include only those elements but may include other elements not expressly listed and/or inherent thereto. Unless stated otherwise, the term "exemplary" means "example" rather than "ideal." Various terms of approximation may be used, including "approximately" and "generally." Approximately means "roughly" or within 10% of a stated number or outcome and generally means "usually" or more than a 50% probability of a stated number or outcome.

Connective terms such as "attached to," "attachable to," and "attaching" are intended to generically describe a structural connection between two or more elements. Some structural connections may be "rigidly attached" so that the connected elements are generally non-rotatable relative to one another, as when the elements are formed together (e.g., bolted or welded) and cannot be rotated independently without deflecting relative to one another or being damaged. Other structural connections may be "rotatably or movably attached" so that the connected elements are coupled together to permit movements relative to one another, as when the elements are pinned together (e.g., or any type of rotating, sliding, and/or telescoping connection) and can be rotated freely and independently without damage. Still other connections may be "resiliently attached" so that the connected elements are resiliently deflectable relative to one another, as when the elements form a moment connection that allows the transfer of bending moment forces between the elements, causing deflections that allow for limited rotations. Unless stated otherwise, these exemplary connective terms and their modifiers may comprise any such variations.

Figure 5:
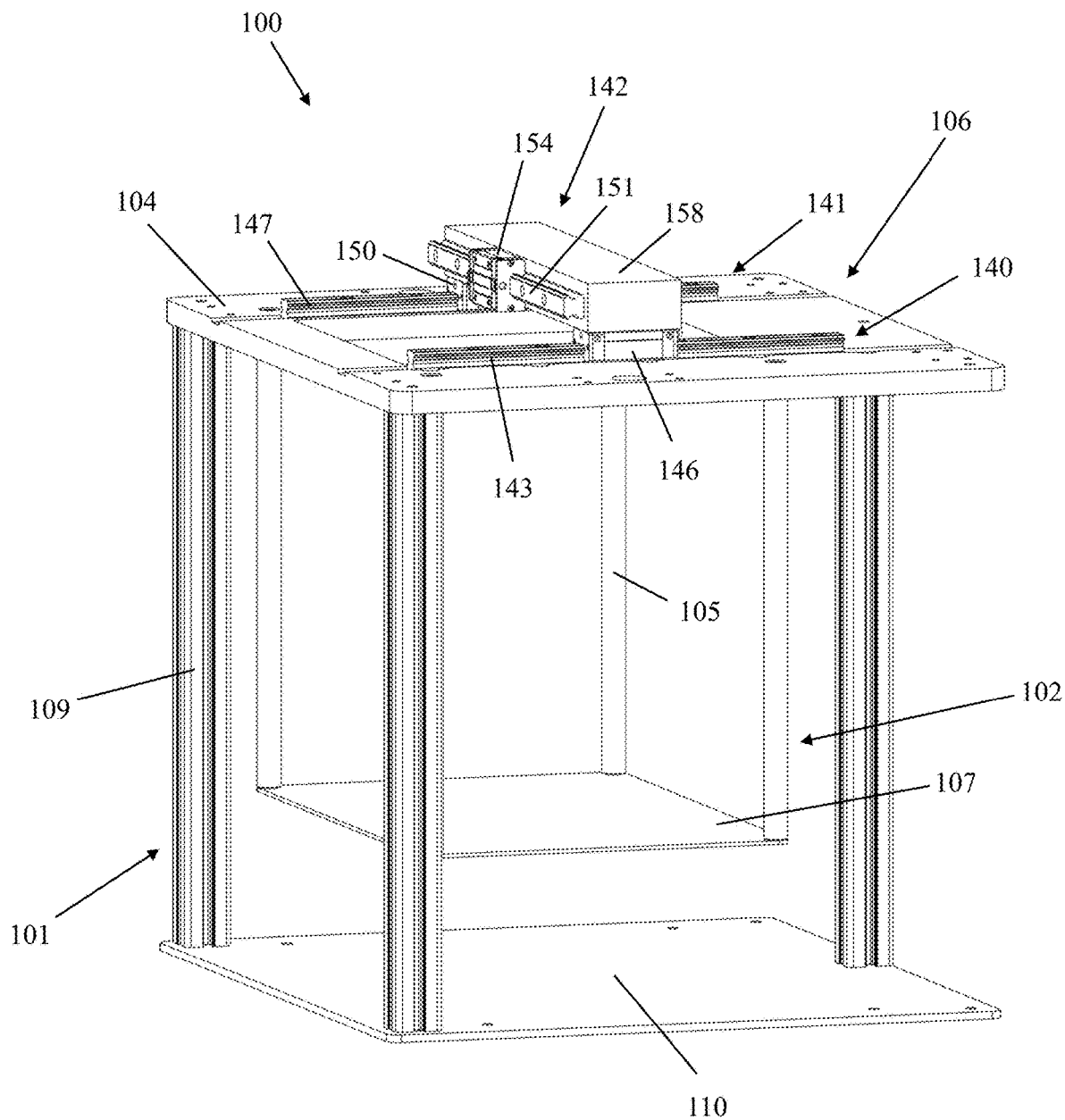
FIG. 5 depicts a perspective view of an exemplary motion isolation apparatus.
Figure 5:
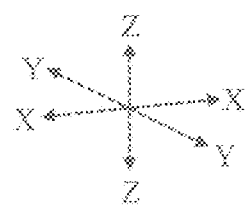

Aspects of this disclosure are now described with reference to an exemplary motion assembly apparatus 100. Motion assembly apparatus 100 may be described with reference to three orthogonal axes, including a first horizontal axis X-X, a second horizontal axis Y-Y, a vertical axis Z-Z. Different guiding structures for constraining movements of a 3D printhead relative to axis X-X, axis Y-Y, and/or axis Z-Z are disclosed. As shown in FIG. 5, motion assembly apparatus 100 may comprise a structural frame (or fixed frame) 101 and a floating frame 102, in which floating frame 102 may comprise a stiffness greater than a stiffness of structural frame 101 so that accelerating a 3D printhead (e.g., such as 3D printhead 260 of FIG. 7, 3D printhead 360 of FIG. 10 and the like) attached to floating frame 102 may reliably cause elastic deflections of structural frame 101 that increase print quality and unlock faster print speeds.

Floating frame 102 may comprise a motion assembly plate 104, vertical guides 105, horizontal guides 106, and a 3D print surface 107.

Motion assembly plate 104 may be operable with horizontal guides 106 to transfer forces between structural frame 101 and a 3D printhead. As shown in FIG. 5, motion assembly plate 104 may have a rectangular shape and be made from a metal. Aspects of motion assembly plate 104, such as its shape and thickness, may be sized to minimize deflections of plate 104 itself. As shown in FIG. 5, motion assembly plate 104 may comprise a 0.75-inch metal plate (e.g., an aluminum plate) with various cuts, grooves, and openings.

Movements of a 3D printhead and/or 3D print surface 107 relative to motion assembly plate 104 may be coordinated through different configurations of vertical guides 105, horizontal guides 106 and/or their respective attachments to motion assembly plate 104. Motion isolation apparatus 100 may comprise or be sold with electro-mechanical actuators having elements that are attachable to motion assembly plate 104 and operable with guides 105, 106 to move the 3D printhead and/or 3D print surface 107 relative to assembly plate 104. The various cuts, grooves, openings, and housings of plate 104 may attach and support these elements.

Vertical guides 105 may help to reduce oscillating forces experienced by motion isolation apparatus 100 when moving a 3D printhead attached to horizontal guides 106 at high speeds during normal operations of apparatus 100. As shown in FIG. 5, vertical guides 105 may extend generally downwardly from motion assembly plate 104 along vertical axis Z-Z to support 3D print surface 107 at different locations below plate 104 and also be operable to guide vertical movements of 3D print surface 107 between the different locations. Vertical guides 105 may be rigid metal structures that are directly attached to motion assembly plate 104 and not directly attached to structural frame 101 or 3D print surface 107. As shown in FIG. 5, vertical guides 105 may comprise four 20 mm diameter metal rods (e.g., made of AISI118 steel) having top ends that are rigidly attached (e.g., bolted or welded) to motion assembly plate 104 and bottom ends that are cantilevered out from motion assembly plate 104 and not otherwise attached to structural frame 101.

Each vertical guide 105 may have a stiffness that minimizes deflections of its cantilevered bottom ends relative to motion assembly plate 104 during normal operations of motion isolation apparatus 100. Because of their strengths and stiffnesses, vertical guides 105 also may be used to guide vertical movements of 3D print surface 107 along vertical axis Z-Z. As shown in FIG. 5, 3D print surface 107 may be movably attached to vertical guides 105 and physically moveable relative to 3D print surface 107 with an electro-mechanical actuator comprising any combination of mechanical elements (e.g., ball screws, belts, lead screws, linear bearings, rollers, tracks, and the like, including those made by Lishui Yingte Bearing Bo., Ltd.) and electrical elements (e.g., electric motors made by Shanghai Siheng Motor Co., Ltd.) operable to cause controllable and precise vertical movements of 3D print surface 107 along vertical axis Z-Z in directions toward and away from motion assembly plate 104 when moving a 3D printhead attached to horizontal guides 106 at high speeds during normal operations of apparatus 100.

Horizontal guides 106 may be operable to guide horizontal movements of a 3D printhead relative to motion assembly plate 104. For example, horizontal guides 106 may be attached to motion assembly plate 104 and operable to guide the horizontal movements along first horizontal axis X-X and/or second horizontal axis Y-Y. As shown in FIG. 5, horizontal guides 106 may comprise a first horizontal guide 140, a second horizontal guide 141, and a third horizontal guide 142.

As shown in FIG. 5, first horizontal guide 140 may be located on one side of motion assembly plate 104, second horizontal guide 141 may be located on an opposite side of motion assembly plate 104, and third horizontal guide 142 may span between guides 140 and 141. Guides 140 and 141 may be aligned with one another and configured to guide movements of the 3D printhead along axis X-X. Guide 142 may arranged transversely with guides 140, 141, aligned with axis Y-Y, and configured to guide movements of the 3D printhead along axis Y-Y.

Horizontal guides 140, 141, and 142 may comprise "linear guideways" that utilize rolling elements (e.g., balls or rollers) to allow and control linear motions. For example, by using recirculating rolling elements captured between a rail and a bearing block, horizontal guides 140, 141, and 142 may achieve high precision linear motion with a coefficient of friction exponentially less (e.g., 1/50th) than that of traditional slides. In complement, because of the restraint effect between the exemplary rails and bearing blocks described below, horizontal guides 140, 141, and 142 may transfer forces to motion assembly plate 104 in directions along horizontal axis X-X, horizontal axis Y-Y, and/or vertical axis Z-Z. By way of example, each of horizontal guides 140, 141, and 142 may comprise a linear guideway like those made by HIWIN® (www.hiwin.tw).

As shown in FIG. 5, first horizontal guide 140 may comprise a rail 143 and a bearing block or carriage 146. Rail 143 may be aligned with axis X-X to permit sliding motions in a direction along axis X-X and prevent movements in directions along axis Y-Y. Rail 143 may comprise an elongated structure made of a metal (e.g., 1040 steel). As shown in FIG. 5, rail 143 may be formed to have an "I" shaped cross-section. Bearing block 146 may be operable with rail 143. As shown in FIG. 5, bearing block 146 may comprise a force transfer structure with an interior channel having a corresponding "I" shape sized to receive that of rail 143. The interior channel of bearing block 146 may be shaped to capture rolling elements (e.g., ball bearings) between rail 143 and bearing block 146 to achieve high precision linear motion along horizontal axis X-X therewith and a low coefficient of friction therebetween.

Second horizontal guide 141 may be structurally similar to first horizontal guide 140. As shown in FIG. 5, second horizontal guide may similarly comprise a rail 147 and a bearing block or carriage 150 like counterpart rail 143 and bearing block 146 of horizontal guide 140. Bearing block 150 may be similarly operable with rail 147. As shown in FIG. 5, bearing block 146 may comprise a force transfer structure with an interior channel having a corresponding "I" shape sized to receive that of rail 147. Portions of the interior channel of bearing block 150 may be shaped to capture rolling elements (e.g., ball bearings) between rail 147 and block 150 to achieve high precision linear motion therewith and a low coefficient of friction therebetween. As described herein, second horizontal guide 141 may be operable with first horizontal guide 140 to guide movements of the 3D printhead along axis X-X using one or more electro-mechanical actuators attached to motion assembly plate 104.

Third horizontal guide 142 may be structurally similar to first horizontal guide 140 and second horizontal guide 141. As shown in FIG. 5, third horizontal guide 142 may similarly comprise a rail 151 and a bearing block or carriage 154 like counterpart rails 143, 147 and bearing blocks 146, 150 like those of horizontal guides 140, 141. Rail 151 may be aligned with axis Y-Y to permit sliding motions in a direction along axis Y-Y and prevent movements in directions along axis X-X. Rail 151 may comprise another elongated structure made of a metal (e.g., 1040 steel) and formed to have an "I" shaped cross-section. Bearing block 154 may be similarly operable with rail 151. As shown in FIG. 5, bearing block 154 may comprise a force transfer structure with an interior channel having a corresponding "I" shape sized to receive that of rail 151. Portions of the interior channel of bearing block 154 also may be shaped to capture rolling elements (e.g., ball bearings) between rail 151 and block 154 to achieve high precision linear motion therewith and a low coefficient of friction therebetween.

Figure 7:
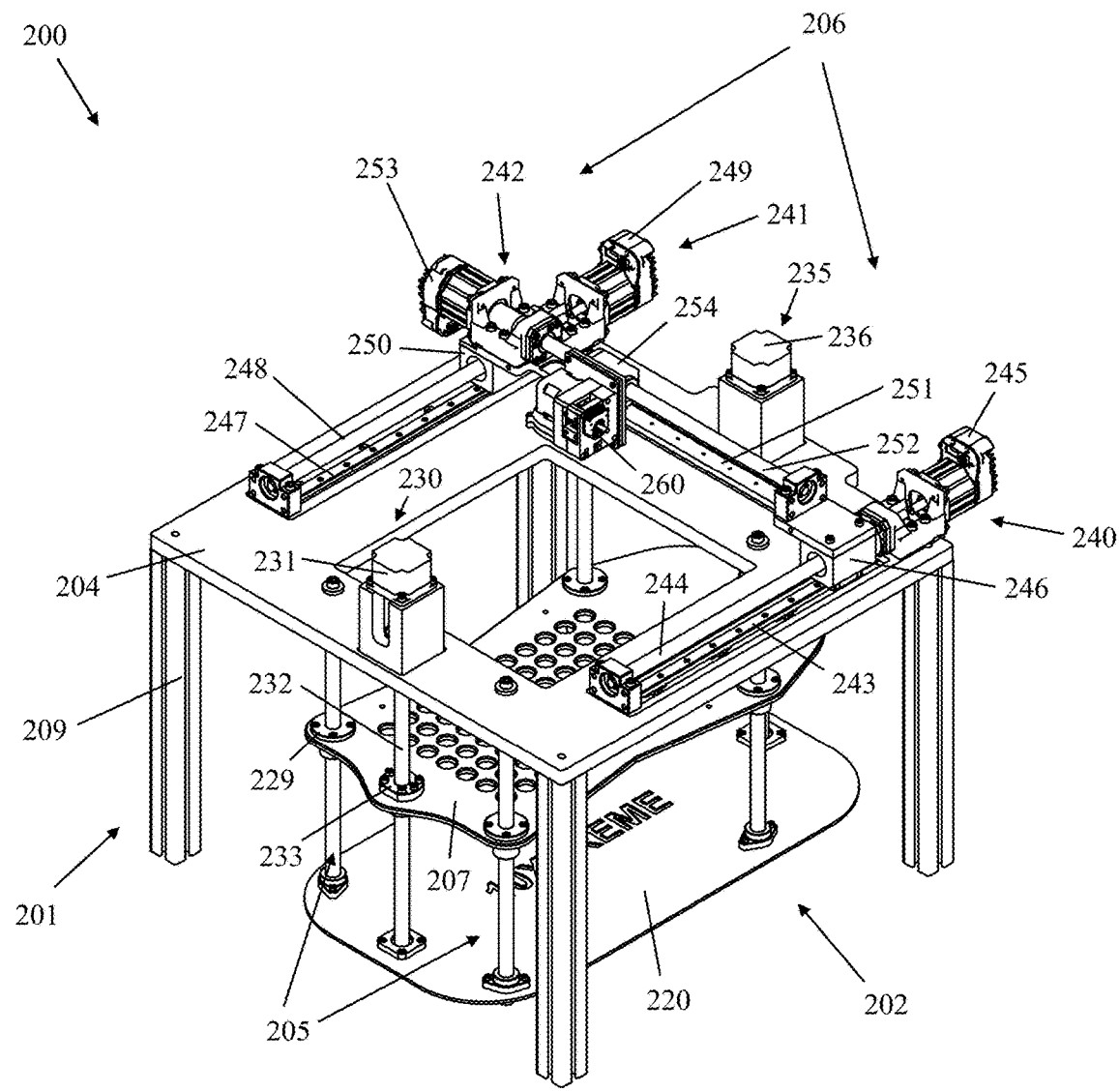
FIG. 7 depicts a perspective view of another exemplary motion isolation apparatus.
Figure 7:
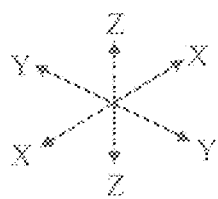
Figure 8:
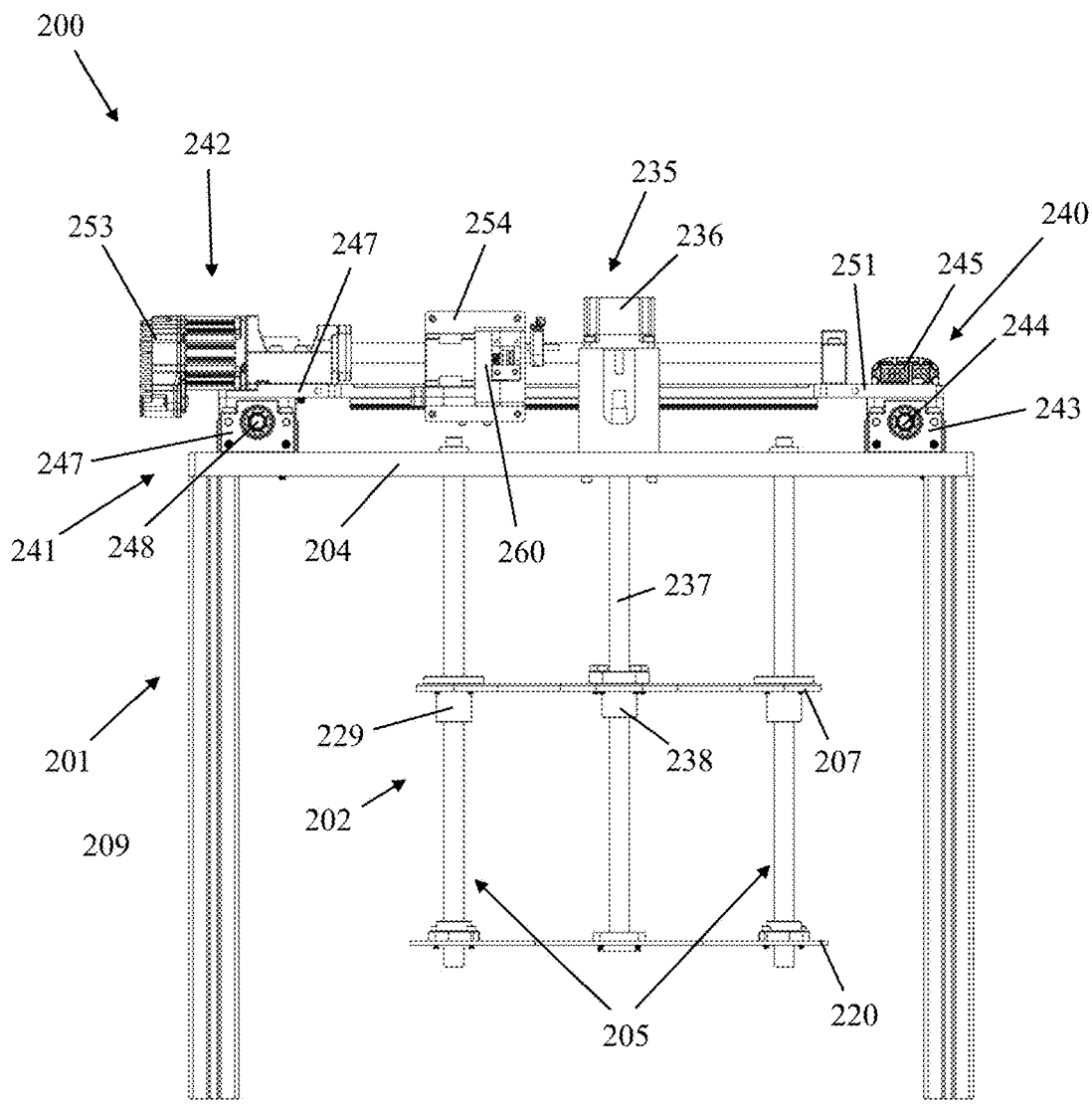
FIG. 8 depicts a side view of the FIG. 7 apparatus.
Figure 8:
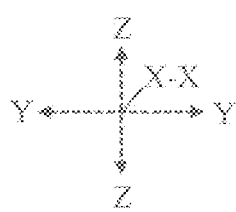
Figure 10:
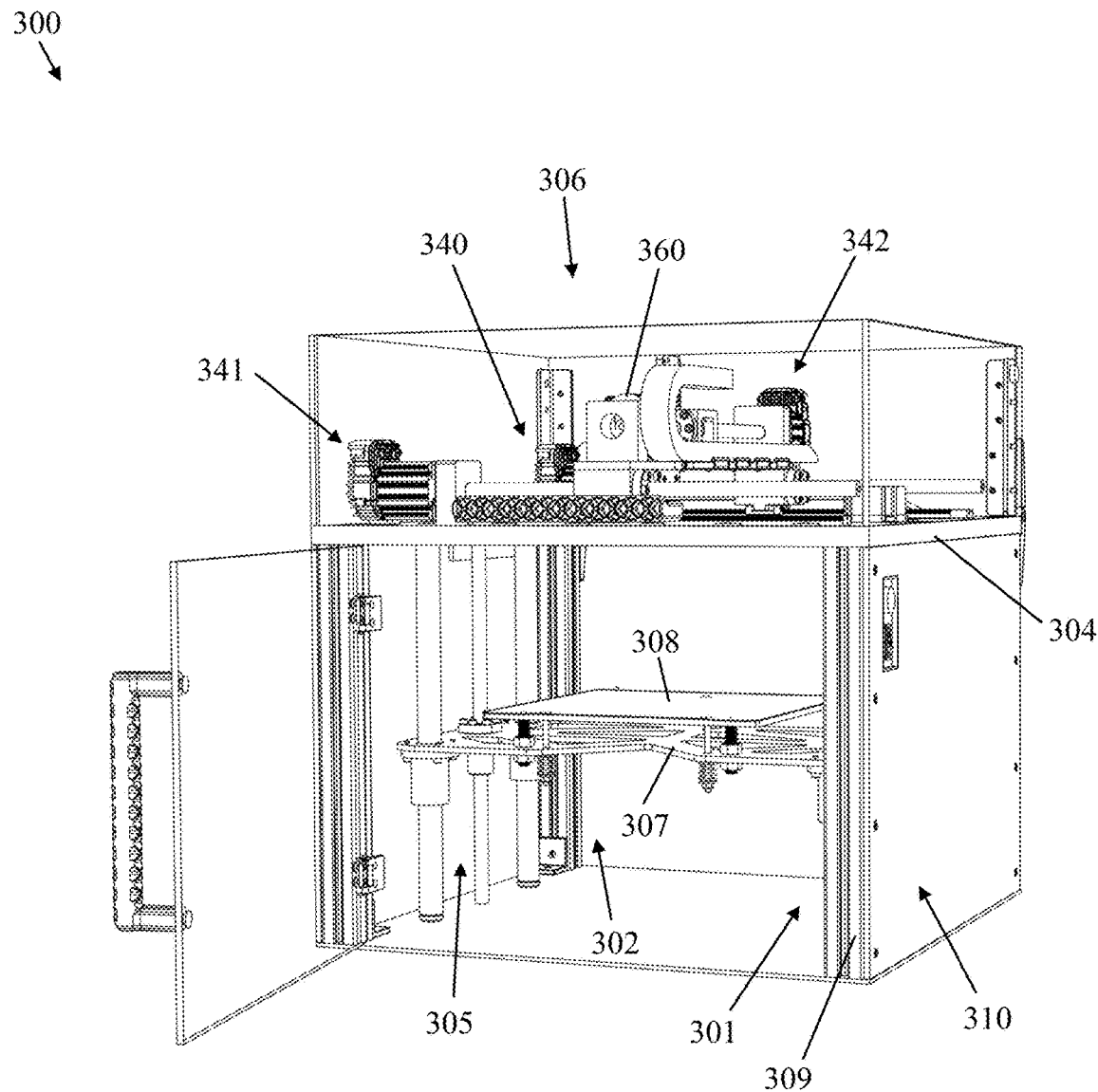
FIG. 10 depicts a perspective view of another exemplary motion isolation apparatus.
Figure 10:
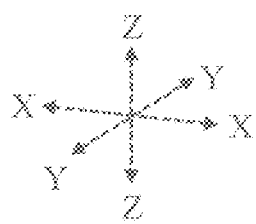
Figure 11:
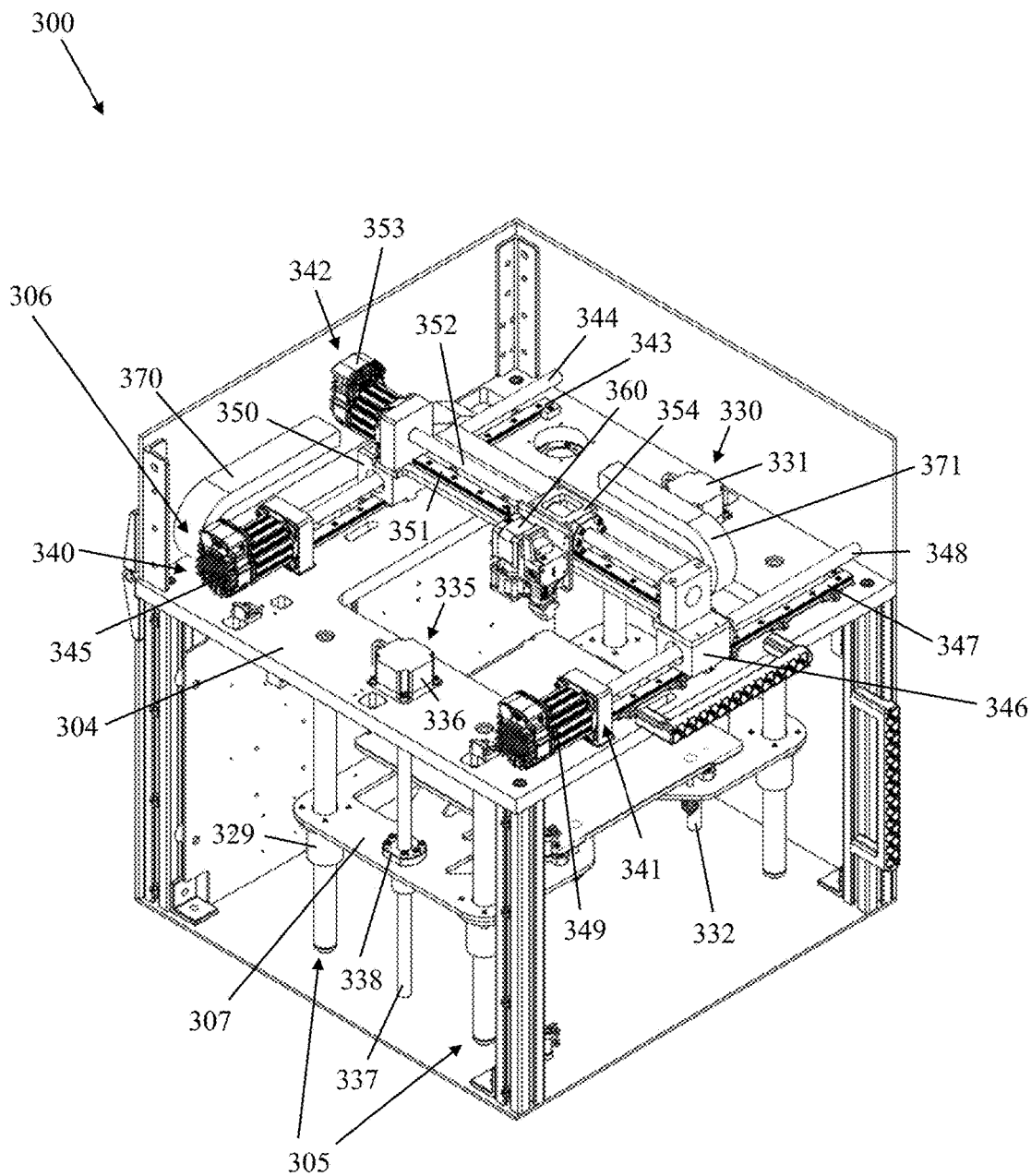
FIG. 11 depicts another perspective view of the FIG. 10 apparatus.

In contrast to guides 140, 141, third horizontal guide 142 also may comprise a force transfer beam 158, such as a metal tube (e.g., made of aluminum or steel) with a sidewall thickness of approximately 0.375 inches. One end of force transfer beam 158 may be attached to bearing block 146 of horizontal guide 140 and the other end of force transfer beam 158 may be attached to bearing block 150 of horizontal guide 141, allowing for movements of force transfer beam 158 together with guides 140, 141, and 142 and any 3D printing elements attached to beam 158, such as a 3D printhead (e.g., such as 3D printhead 260 of FIGS. 7-9, 3D printhead 360 of FIGS. 10-12, and the like), in directions along horizontal axis X-X. Similar to as shown in FIGS. 7, 8, and 11, the 3D printhead may be operatively attached to bearing blocks 154, 254, and/or 354 and thus movable therewith along axis Y-Y using one or more electro-mechanical actuators attached to motion assembly plate 104 or equivalent. Third horizontal guide 142 may thus be operable with vertical guides 105 and horizontal guides 140, 141 to guide movements of the 3D printhead along axis X-X, Y-Y, and/or Z-Z.

Floating frame 102 may comprise solid structures attached to one another with rigid connections, making the structures stiff relative to one another. As shown in FIG. 5, motion assembly plate 104 and vertical guides 105 may be rigidly attached with moment connections or other joints that allow the transfer of bending moment forces between plate 104 and guides 105.

Structural frame 101 may comprise columns or uprights 109 that support motion isolation apparatus 100 vertically and deform elastically responsive to movements of a 3D printhead (e.g., 3D printhead 260 of FIG. 7). Columns 109 may comprise elongated metal structures with sidewalls defining hollow cross-sectional areas having zones shaped to consistently and predictably guide elastic deflections in one or more directions, making structural frame 101 consistently and predictably dynamic during normal operations of motion isolation apparatus 100. As shown in FIG. 5, each column 109 may comprise a 4040 Aluminum extrusion. Columns 109 may have different cross-sectional shapes depending on the amount and frequency of oscillating forces being applied thereto and effectively dampened therewith. For example, the hollow cross-sectional shapes of columns 109 may comprise any standard cross-sectional shapes.

As shown in FIG. 5, structural frame 101 may comprise an optional base plate 110 that is flexibly or rigidly attached to one or more of columns 109. Optional base plate 110 may be attachable to the ground or floor. As shown in FIG. 5, optional base plate 110 may comprise a 0.75-inch metal plate (e.g., an aluminum plate) with various attachment openings.

The geometrical arrangement of columns 109 relative to one another, axis X-X, axis Y-Y, and/or optional base plate 110 may be optimized to maximize their dampening ability. As shown in FIG. 5, columns 109 may be arranged in a triangular formation along axes X-X and Y-Y. The hollow cross-sectional shapes of columns 109 and different portions thereof may be aligned with one another, axis X-X, and/or axis Y-Y to promote deflections along axis X-X or Y-Y responsive.

Figure 9:
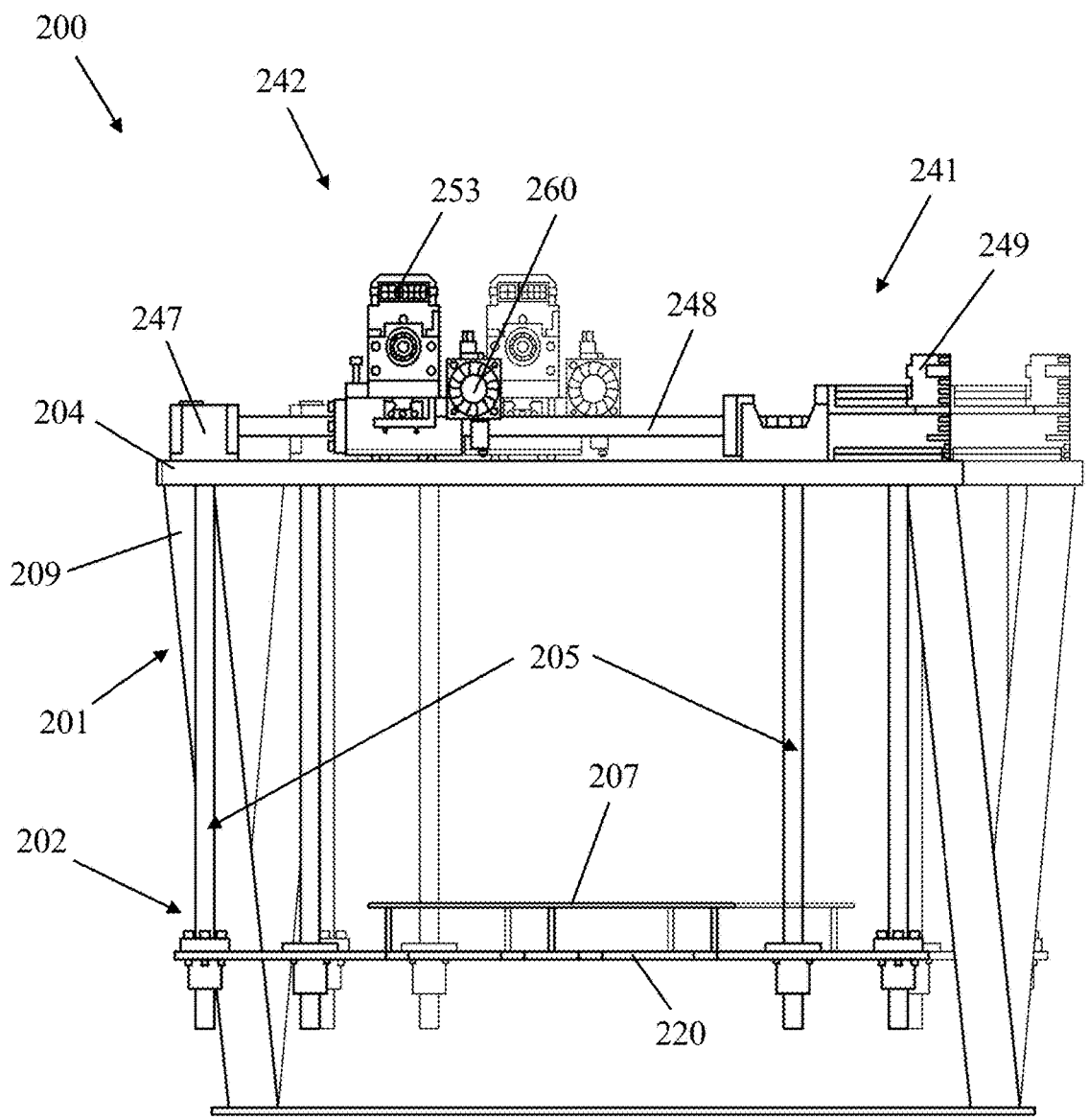
FIG. 9 depicts a side view of the FIG. 7 apparatus during operation.
Figure 9:
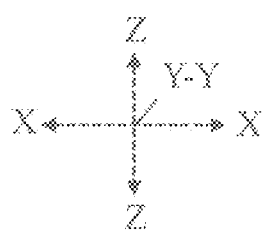

Additional aspects of this disclosure are now described with reference to an exemplary motion assembly apparatus 200 shown in FIGS. 7 to 9 and an exemplary motion assembly apparatus 300 shown in FIGS. 10 to 13. Aspects of motion isolation apparatus 200 and/or 300 may be like aspects motion isolation apparatus 100, but within the 200 or 300 series of numbers. Aspects of motion isolation apparatus 100 may be interchangeably combined with any aspects of motion isolation apparatus 200, motion isolation apparatus 300, and/or any obvious variations thereof, each combination and/or iteration being part of this disclosure.

Motion assembly apparatus 200 may be similarly described with reference to three orthogonal axes, including a first horizontal axis X-X, a second horizontal axis Y-Y, a vertical axis Z-Z. Different guiding structures for constraining motions of a 3D printhead relative to axis X-X, axis Y-Y, and/or axis Z-Z may be utilized. As shown in FIG. 7, motion assembly apparatus 200 may comprise a structural frame 201 and a floating frame 202, in which floating frame 202 may comprise a stiffness greater than a stiffness of structural frame 201 so that accelerating a 3D printhead 260 attached to floating frame 202 may reliably cause elastic deflections of structural frame 201 that increase print quality and unlock faster print speeds.

Structural frame 201 may comprise columns or uprights 209 that support motion isolation apparatus 200 vertically and deform elastically responsive to movements of 3D printhead 260. Columns 209 may comprise elongated metal structures with hollow cross-sectional areas like those of columns 109 described above. As shown in FIG. 9, because of aspects like their material strength, structural shape, and/or connections to floating frame 202, columns 209 may be operable like columns 109 to dampen oscillating forces applied to floating frame 202 with 3D printhead 260 by deflecting elastically relative to floating frame 202. These aspects of columns 209 may be optimized to maximize their dampening capabilities. As shown in FIG. 7, columns 209 may be extruded from 4040 aluminum through a dye having bidirectional symmetrical hollow shape. As shown in FIGS. 7 and 8, the bidirectional symmetrical hollow shape of columns 209 may have boundary shapes (e.g., four corners) that may be aligned with corresponding boundary shapes of floating frame 202 (e.g., the four corners of motion assembly plate 204) to promote consistent and predictable deflections of columns 209 when 3D printhead 260 is accelerating.

The geometrical arrangement of columns 209 relative to one another, axis X-X, and/or axis Y-Y also may be optimized to maximize their dampening ability. As shown in FIG. 7, columns 209 may be arranged in a rectangular formation along axes X-X and Y-Y. The bidirectional symmetrical hollow shapes of columns 209 and different portions thereof may be aligned with one another, axis X-X, and/or axis Y-Y to promote consistent and predictable deflections.

As shown in FIGS. 7, 8, and/or 9, floating frame 202 may comprise a motion assembly plate 204, vertical guides 205, horizontal guides 206, and a 3D print surface 207.

Like plate 104, motion assembly plate 204 may be operable to transfer forces between structural frame 201 and 3D printhead 260. As shown in FIG. 7, motion assembly plate 204 may have a rectangular shape made from metal. Aspects of motion assembly plate 204, such as its shape and thickness, may be sized to minimize deflections of plate 204 itself during normal operations of motion isolation apparatus 200. As shown in FIG. 7, motion assembly plate 204 may comprise a 2.0-inch metal plate (e.g., an aluminum plate) with various cuts, grooves, openings, and housings.

Movements of 3D printhead 260 and/or 3D print surface 207 relative to motion assembly plate 204 may be coordinated through different configurations of guides 205, 206 and their attachments to motion assembly plate 204. Motion isolation apparatus 200 may comprise or be sold with one or more electro-mechanical actuators having elements that are attachable to motion assembly plate 204 and operable with guides 205, 206 to coordinate the movements. The various cuts, grooves, openings, and housings of plate 204 may attach and support these elements.

Vertical guides 205 may help to reduce oscillating forces experienced by motion isolation apparatus 200 when moving 3D printhead 260 at high speeds. As shown in FIG. 7, vertical guides 205 may extend downwardly from motion assembly plate 204 along vertical axis Z-Z to support 3D print surface 207 at locations below plate 204 and also be operable to guide vertical movements of 3D print surface 207 relative to motion assembly plate 204. Vertical guides 205 may not be directly attached to structural frame 201 or 3D print surface 207. As shown in FIG. 7, like vertical guides 105 described above, vertical guides 205 also may comprise four 20 mm diameter metal rods (e.g., AISI1018 steel) that are indirectly attached to structural frame 201 by motion assembly plate 204 and movably attached 3D print surface 207. As shown in FIG. 7, each vertical guide 205 may pass through an opening in 3D print surface 207 and a sleeve 229 with interior surfaces that are operable with (e.g., slidable against) exterior surfaces of vertical guides 205 to constrain the vertical movements of and stabilize 3D print surface 207.

Floating frame 202 may further comprise an optional bottom plate 220. As shown in FIG. 7, optional bottom plate 220 may comprise a 0.375-inch metal plate (e.g., an aluminum plate) with various attachment openings. Each vertical guide 205 may be attached (e.g., bolted to bottom plate 220 (if present) using one of the attachment openings.

Floating frame 202 may comprise at least one electro-mechanical actuator that is attached to motion assembly plate 204 and comprises mechanical elements (e.g., ball screws, belts, lead screws, linear bearings, rollers, rails, and the like, including those made by Lishui Yingte Bearing Co., Ltd.) and electrical elements (e.g., electric motors made by Shanghai Siheng Motor Co., Ltd.) operable to cause controllable and precise vertical movements of 3D print surface 207 along vertical axis Z-Z in directions toward and away from motion assembly plate 204.

As shown in FIGS. 7 and/or 8, floating frame 202 may comprise a first vertical actuator 230 and a second vertical actuator 235. As shown in FIG. 7, first vertical actuator 230 may be operatively attached to one side of motion assembly plate 204 and comprise an electric motor 231, a driveshaft 232, and a coupler 233. Electric motor 231 may be mounted to motion assembly plate 204 in a force transfer housing operable to transfer torque between motor 231 and plate 204. For example, electric motor 231 may comprise a 24V stepper motor like those produced by Shanghai Siheng Motor Co., Ltd. Driveshaft 232 may comprise a threaded rod that is rotatable with electric motor 231. Coupler 233 may comprise a threaded sleeve with interior threads operable with exterior threads of driveshaft 232 to move 3D print surface 207 vertically relative to 3D printhead 260.

Second vertical actuator 235 may be structurally similar to first vertical actuator 230. As shown in FIGS. 7 and/or 8, second vertical actuator 235 may similarly comprise an electric motor 236, a driveshaft 237, and a coupler 238 like counterpart electric motor 231, driveshaft 232, and coupler 233 of first vertical actuator 230. First vertical actuator 230 may be operable with second vertical actuator 235 to move 3D print surface 207 vertically in directions toward and away from motion assembly plate 204. As shown in FIG. 7, electric motor 236 may be operable with electric motor 231 to move 3D print surface 207 vertically along axis Z-Z. For example, electric motor 236 also may comprise another 24V stepper motor like those produced by Shanghai Siheng Motor Co., Ltd.

Horizontal guides 206 may be attached to motion assembly plate 204 and operable to guide horizontal movements of 3D printhead 260 relative to plate 204 along horizontal axes X-X, Y-Y and constrain vertical movements of 3D printhead 260 relative to 3D print surface 207 along vertical axis Z-Z. As shown in FIGS. 7, 8, and/or 9, horizontal guides 206 may comprise a first horizontal guide 240, a second horizontal guide 241, and a third horizontal guide 242.

As shown in FIG. 7, first horizontal guide 240 may be located on one side of motion assembly plate 204, second horizontal guide 241 may be located on an opposite side of motion assembly plate 204, and third horizontal guide 242 may span between guides 240 and 241. Guides 240 and 241 may be aligned with one another and configured to guide movements of 3D printer 360 along axis X-X. Guide 242 may arranged transversely with guides 240, 241, and configured to guide movements of 3D printer 360 along axis Y-Y.

As shown in FIG. 7, first horizontal guide 240 may comprise a rail 243, a driveshaft 244, an electric motor 245, and a bearing block or carriage 246. Rail 243 may comprise a structural frame that is rigidly attached to motion assembly plate 204, rotatably attached to driveshaft 244, and operatively attached to electric motor 245. The structural frame of rail 243 may be formed from an aluminum sheet and operable to transfer oscillating forces caused by moving 3D printhead 260 from the driveshaft 244, electric motor 245, and/or 3D printhead 260 to motion assembly plate 204, which in turn may transfer the oscillating forces to structural frame 201.

As shown in FIG. 7, driveshaft 244 may comprise a threaded rod that is rotatably attached to and supported by rail 243. Electric motor 245 may be attached to one end of rail 243. For example, electric motor 245 may comprise a 24V Clearpath Servo Motors Produced by Teknic Inc. One end of the threaded rod may be attached to an output shaft of electric motor 245 at a working end of rail 243. The other end of the threaded rod may be rotatably attached to a bearing block at an opposite end of rail 243. Bearing block 246 may comprise interior threads operable with exterior threads of driveshaft 244 to move bearing block 246 along horizontal axis X-X when driveshaft 244 is rotated by electric motor 245.

Second horizontal guide 241 may be structurally similar to first horizontal guide 240. As shown in FIG. 7, second horizontal guide may similarly comprise a rail 247, a driveshaft 248, an electric motor 249, and a bearing block or carriage 250 like counterpart rail 243, driveshaft 244, electric motor 245, and bearing block 246 of horizontal guide 240. First horizontal guide 240 may be operable with second horizontal guide 241 to guide movements of 3D printhead 260 along horizontal axis X-X. As shown in FIG. 7, electric motor 245 may be operable with electric motor 249 to move 3D printhead 260 along axis X-X. For example, electric motor 249 also may comprise another 24V Clearpath Servo Motor Produced by Teknic Inc.

Third horizontal guide 242 may be structurally similar to horizontal guides 240, 241. As shown in FIGS. 7, 8, and/or 9, third horizontal guide 242 may similarly comprise a rail 251, a driveshaft 252, an electric motor 253, and a bearing block or carriage 254 like counterpart rails 243 driveshaft 244, electric motor 245, and bearing block 246 of guide 240 and counterpart rail 247, driveshaft 248, and electric motor 249, and bearing block 250 of guide 241. One end of rail 251 may be attached to bearing block 246 of horizontal guide 240 and the other end of rail 251 may be attached to bearing block 250 of horizontal guide 241. As shown in FIG. 7, one end of driveshaft 252 may be attached to an output shaft of electric motor 253 at a working end of rail 251 adjacent bearing block 250 and the other end of driveshaft 252 may be rotatably attached to an opposite end of rail 251 adjacent bearing block 246. Bearing block 254 may comprise interior threads operable with exterior threads of driveshaft 252 to move bearing block 254 along axis Y-Y when driveshaft 252 is rotated by electric motor 253.

As shown in FIG. 7, 3D printhead 260 may be operatively attached to bearing block 254 and thus movable therewith along axis Y-Y by operating electric motor 253. 3D printhead 260 may comprise any type of 3D printhead. Third horizontal guide 242 may thus be operable with vertical guides 205, vertical actuators 230, 235, and horizontal guides 240, 241 to guide movements of 3D printhead 260 along the X-X, Y-Y, and/or Z-Z axes. As shown in FIG. 7, electric motor 253 may be operable with counterpart electric motors 245, 249 to move 3D printhead 260 in directions along axis X-X, Y-Y, and/or Z-Z. For example, electric motor 253 also may comprise a 24V Clearpath Servo Motor Produced by Teknic Inc.

Although not required, any of electric motors 231, 236, 245, 249, and/or 253 may be interchangeable to reduce maintenance costs associated with motion isolation apparatus 200.

Figure 12:
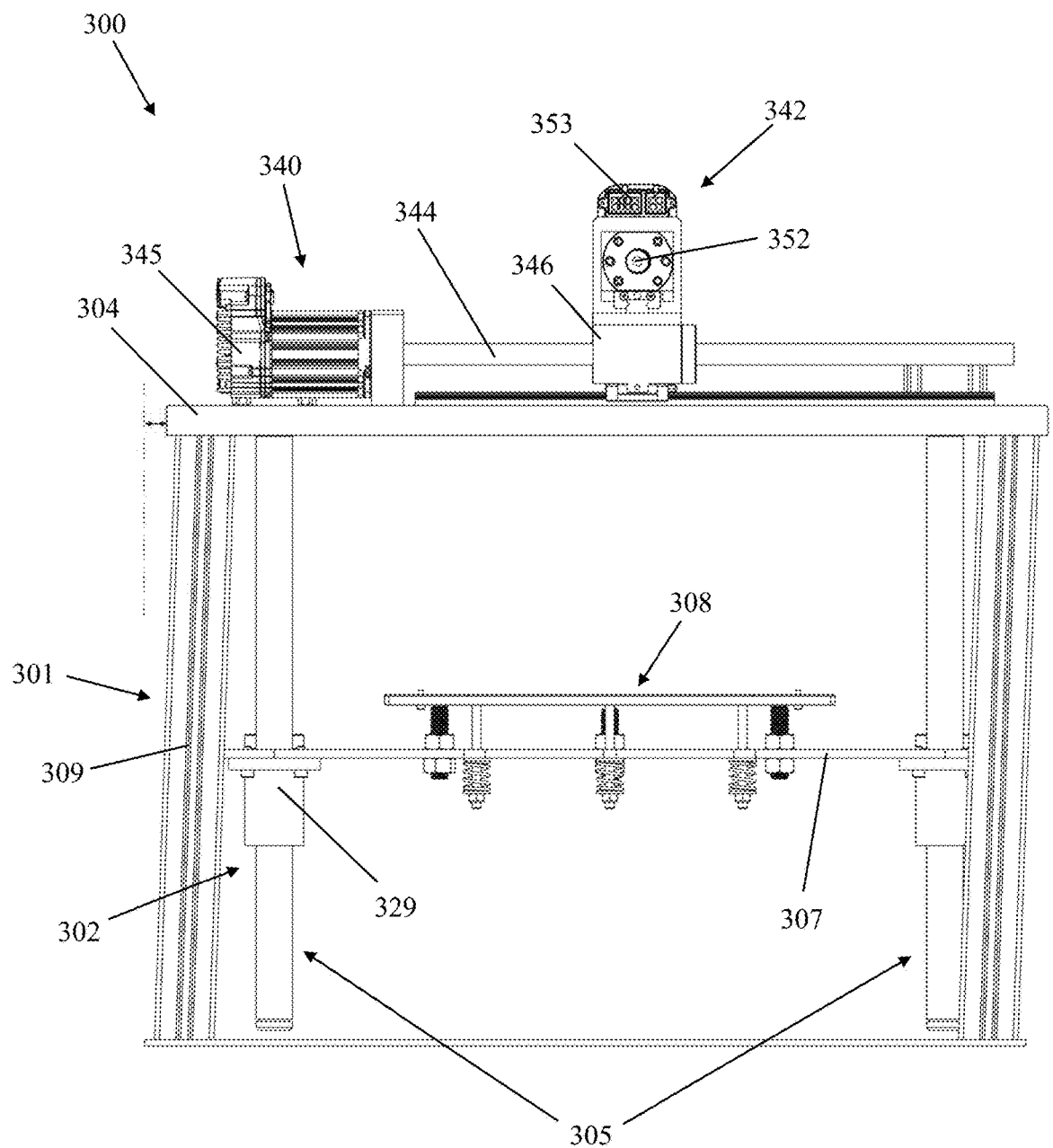
FIG. 12 depicts a side view of the FIG. 10 apparatus during operation.

Motion assembly apparatus 300 also may be described with reference to three orthogonal axes, including a first horizontal axis X-X, a second horizontal axis Y-Y, a vertical axis Z-Z. Different guiding structures for constraining motions of a 3D printhead relative to axis X-X, axis Y-Y, and/or axis Z-Z. As shown in FIGS. 10, 11, 12, and/or 13 motion assembly apparatus 300 may comprise a structural frame 301 and a floating frame 302, in which floating frame 302 may comprise a stiffness greater than a stiffness of structural frame 301 so that accelerating a 3D printhead 360 attached to floating frame 302 may reliably cause elastic deflections of structural frame 301 that increase print quality and unlock faster print speeds.

Structural frame 301 may comprise columns or uprights 309 and a housing 310. Columns 309 may be like counterpart columns 109 and/or 209 described above. As shown in FIG. 12, because of their material and structural characteristics and/or connections to floating frame 302, columns 309 may dampen the oscillating forces applied to motion assembly plate 304 with 3D printhead 360 by deflecting elastically relative to plate 304. In keeping with above, aspects of columns 309 may be similarly optimized to maximize their dampening capabilities and promote consistent deflections of columns 309 along axis X-X and/or axis Y-Y.

As shown in FIGS. 10 and/or 11, housing 310 may comprise a plurality of flexible panels that are attached to exterior surfaces of columns 309, including an operable front panel, side panels, a back panel, and a base panel. The side and back panels of housing 310 may affect deflections of structural frame 302 by acting like structural diaphragms connecting different columns 309. Columns 309 may be arranged in a rectangular formation like that of columns 209.

As shown in FIGS. 10, 11, and/or 12, floating frame 302 may comprise a motion assembly plate 304, vertical guides 305, horizontal guides 306, and a 3D print surface 307.

Motion assembly plate 304 may be like motion assembly plates 104, 204 and thus similarly operable to transfer forces between structural frame 301 and 3D printhead 360. Movements of 3D printhead 360 and/or 3D print surface 307 may be similarly coordinated through different configurations of guides 305, 306 and their attachments to motion assembly plate 304. In keeping with above, motion isolation apparatus 300 also may comprise or be sold with electro-mechanical actuators comprising similar mechanical elements and/or electrical elements.

Vertical guides 305 may help to reduce oscillating forces experienced by motion isolation apparatus 300 when moving 3D printhead 360 at high speeds. As shown in FIGS. 11 and/or 12, vertical guides 305 may extend downwardly from motion assembly plate 304 and be operable to guide vertical movements of 3D print surface 307 relative to motion assembly plate 304. As with apparatus 100 and 200, vertical guides 305 may not be directly attached to structural frame 301 or 3D print surface 307. As shown in FIG. 11, much like above, vertical guides 305 may comprise four 25 mm diameter metal rods (e.g., AISI1018 steel) that are indirectly attached to structural frame 301 by motion assembly plate 304 and slidably attached to 3D print surface 307. As shown in FIG. 11, each vertical guide 305 may pass through an opening in 3D print surface 307 and a sleeve 329 with interior surfaces that are slidably against exterior surfaces of vertical guides 305 to constrain the vertical movements of and further stabilize 3D print surface 307.

As also shown in FIGS. 10-12, 3D print surface 307 may comprise an optional kinematic mounting 308 that is attached thereto and operable to support a 3D printed object.

A similar set of electro-mechanical actuators may be attached to motion assembly plate 304 and comprise mechanical elements (e.g., ball screws, belts, lead screws, linear bearings, rollers, tracks, and the like, including those made by Lishui Yingte Bearing Co., Ltd.) and/or electrical elements (e.g., electric motors made by Shanghai Siheng Motor Co., Ltd.) operable to move 3D print surface 307 vertically relative to motion assembly plate 304.

Figure 13:
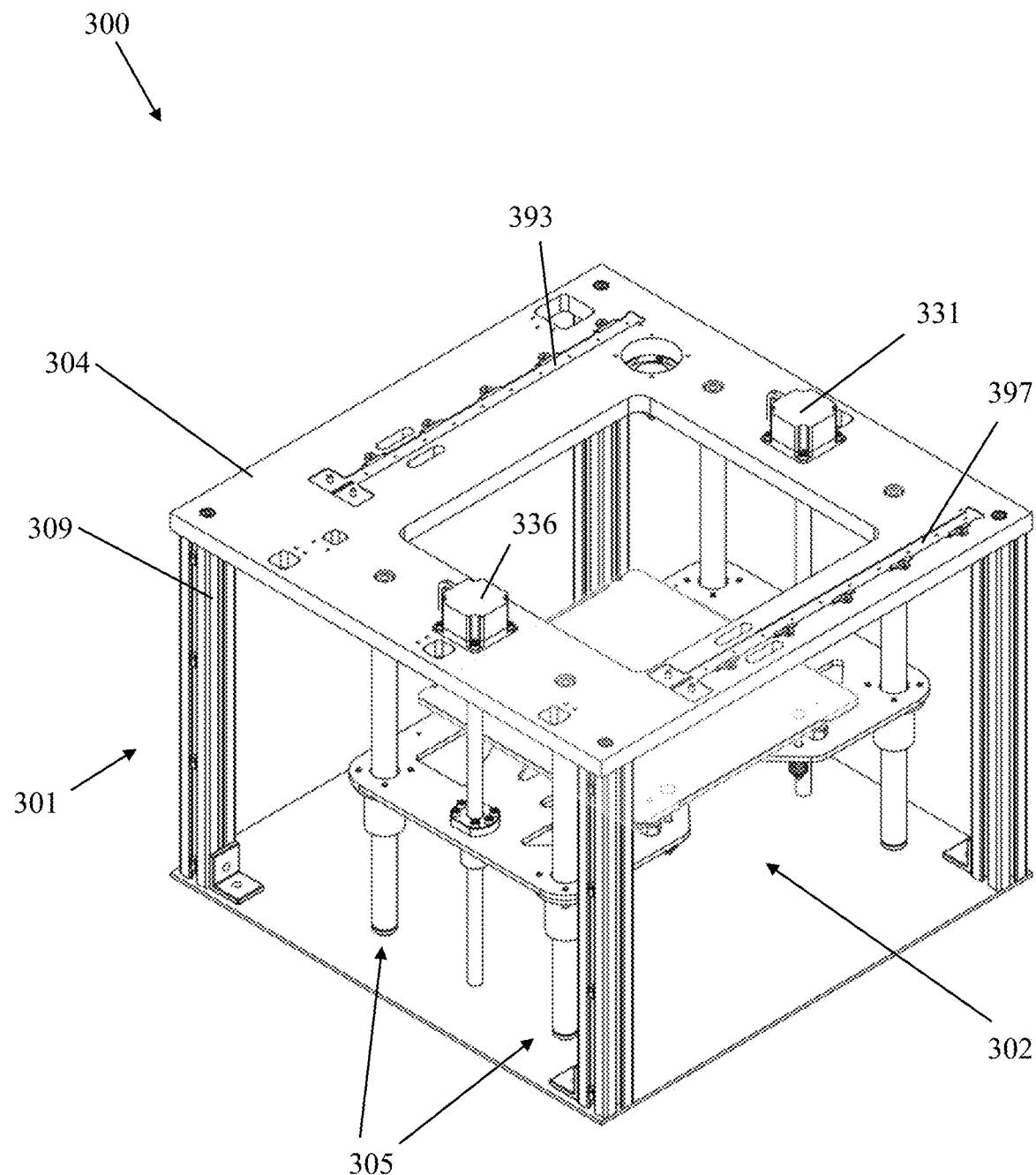
FIG. 13 depicts a perspective view of a component of the FIG. 10 apparatus.

As shown in FIG. 11, vertical guides 305 may similarly comprise a first vertical actuator 330 and a second vertical actuator 335. As shown in FIG. 12, first vertical actuator 330 may be operatively attached to one side of motion assembly plate 304 and comprise an electric motor 331, a driveshaft 332, and a coupler like counterpart electric motor 231, driveshaft 232, and coupler 233 of apparatus 200. As shown in FIG. 11, second vertical actuator 335 may be structurally similar to first vertical actuator 330 and similarly comprise an electric motor 336, a driveshaft 337, and a coupler 338 like counterpart electric motor 231, driveshaft 232, and coupler 233 of apparatus 200. First vertical actuator 330 may thus be operable with second vertical actuator 335 to move 3D print surface 307 vertically relative to motion assembly plate 304. As shown in FIGS. 11 and 13, the housings of motors 331 and 336 may be embedded in an opening of and bolted to motion assembly plate 304 as an alternative to the force transfer housings described above for apparatus 200.

Horizontal guides 306 may be attached to motion assembly plate 304 and operable to guide horizontal movements of 3D printhead 360 relative to motion assembly plate 304 along horizontal axes X-X, Y-Y and constrain vertical movements of 3D printhead 360 relative to 3D print surface 307 along vertical axis Z-Z. As shown in FIG. 11, horizontal guides 306 may comprise a first horizontal guide 340, a second horizontal guide 341, and a third horizontal guide 342.

As shown in FIG. 11, first horizontal guide 340 may be located on one side of motion assembly plate 304, second horizontal guide 341 may be located on an opposite side of motion assembly plate 304, and third horizontal guide 342 may span between guides 340 and 341. Guides 340 and 341 may be aligned with one another and configured to guide movements of 3D printer 360 along axis X-X. As shown in FIG. 11, guide 342 may arranged transversely with guides 340, 341, and configured to guide movements of 3D printer 360 along axis Y-Y.

As shown in FIG. 11, first horizontal guide 340 may comprise a rail 343, a driveshaft 344, an electric motor 345, and a bearing block or carriage 350 like counterpart rail 243, driveshaft 244, electric motor 245, and bearing block 246 of apparatus 200. Second horizontal guide 341 may be structurally similar to first horizontal guide 340 and similarly comprise a rail 347, a driveshaft 348, an electric motor 349, and a bearing block or carriage 346 like counterpart rail 243, driveshaft 244, electric motor 245, and bearing block 246 of apparatus 200. Rails 343, 347 may be attached differently than rails 243, 247. As shown in FIG. 13, motion assembly plate 304 may comprise indentions 393, 397 that are formed to receive a bottom portion of rails 343, 347 (e.g., FIG. 12), allowing forces to be transferred between interior surfaces of indentions 393, 397 and exterior surfaces of rails 343, 347 as well as with bolts extending rails 343, 347 into plate 304.

As shown in FIGS. 10, 11, and/or 12, one end of driveshafts 344, 348 may be operatively attached to output shaft of electric motors 345, 349 and the other end of driveshafts 344, 348 may cantilever outwardly therefrom through bearing blocks 346, 350, thereby reducing the size of rails 344, 348. A diameter of driveshafts 344, 348 may be larger than that of counterpart driveshafts 244, 248 to accommodate the cantilever. Electric motors 345, 349 may be similar to motors 245, 249. Bearing blocks 346, 350 may be similarly operable to driveshafts 344, 348 to move bearing blocks 346, 350 along axis X-X when driveshafts 344, 348 are rotated by motor 345, 349.

As shown in FIGS. 10 and/or 11, third horizontal guide 342 may be structurally similar to horizontal guides 340, 341 and similarly comprise a rail 351, a driveshaft 352, an electric motor 353, and a bearing block or carriage 354 like counterpart rails 243, 247, driveshafts 244, 248, motors 245, 249, and bearing blocks 246, 250 of apparatus 200. One end of rail 351 may be attached to bearing block 346 of horizontal guide 340 and the other end of rail 351 may be attached to bearing block 350 of horizontal guide 341. As shown in FIG. 11, one end of driveshaft 352 may be operatively attached to an output shaft of electric motor 353 adjacent bearing block 350 and the other end of driveshaft 352 may be rotatably attached to a bearing adjacent bearing block 350. Bearing block 354 may be operable with driveshaft 352 to move bearing blocks 354 along axis Y-Y when driveshaft 352 is rotated by electric motor 353.

As shown in FIG. 11, 3D printhead 360 may be operatively attached to bearing block 354 and thus movable therewith along axis Y-Y by operating electric motor 353. Third horizontal guide 342 (e.g., like counterpart guides 142, 242 above) may thus be operable with vertical guides 305 and horizontal guides 340, 341 to guide movements of 3D printhead 360 along axis X-X, Y-Y, and/or Z-Z. As shown in FIG. 11, electric motor 353 may be operable with counterpart electric motors 345, 349 to move 3D printhead 360 in directions along axis X-X, Y-Y, and/or Z-Z.

As shown in FIG. 11, motion isolation apparatus 300 may comprise conduits 370, 371 operable to route electricity, control signals, and/or 3D printing material to elements of horizontal guides 340, 341, and/or 342 along safe paths where they cannot be damaged by 3D printhead 360. For example, conduits 170, 171 may route chainflex control cables like those produced by Igus, Inc.

Figure 14:
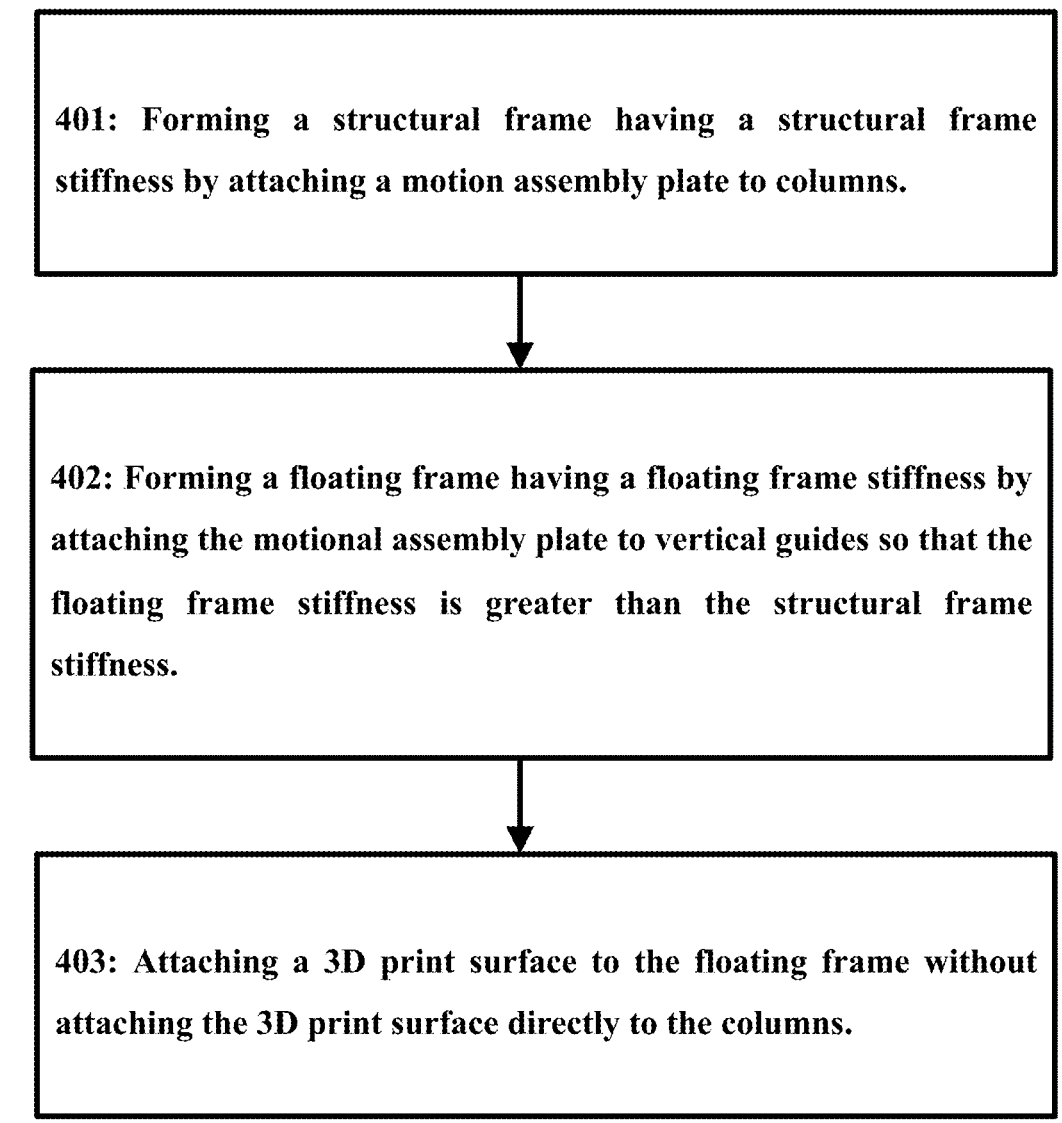
FIG. 14 depicts an exemplary manufacturing method.

An exemplary method 400 of manufacturing motion isolation apparatus 100, 200, and/or 300 is now described. As shown in FIG. 14, an exemplary manufacturing method 400 may comprise: (1) forming a structural frame 101, 201, 301 to have a floating frame stiffness by attaching a motion assembly plate 104, 204, 304 to columns 109, 209, or 309 (a forming step 401); (2) forming a floating frame 102, 202, 302 to have a floating frame stiffness by attaching motion assembly plates 104, 204, 304 to vertical guides 105, 205, 305 so that the floating frame stiffness is greater than the structural frame stiffness (a forming step 402); and (3) attaching a 3D print surface 107, 207, 307 to floating frames 102, 202, 302 (an attaching step 403) without attaching 3D print surface 107, 207, 307 directly to columns 109, 209, or 309.

Forming step 401 may comprise attaching columns 109, 209, 309 to motion assembly plate 104, 204, 304 with a full or partial moment connection operable to transfer bending moment forces between columns 109, 209, 309 and plate 104, 204, 304. Any type of adhesive, fit, welds, or like methods may be utilized. Forming step 401 also may comprise reinforcing the connection as needed to realize a first stiffness of structural frame 101, 201, 301 and performing verifications steps for confirming that the first stiffness is within a target range. For example, step 401 may comprise attaching each column 109, 209, 309 to motion assembly plate 104, 204, 304 with a pinned connection and reinforcing that connection as needed to increase the first stiffness. As shown in FIG. 10, for example, step 401 also may comprise attaching panels of housing 310 to columns 109, 209, 309 as form of concealment and lateral bracing affecting the first stiffness.

Forming step 402 may comprise attaching vertical guides 105, 205, 305 to assembly plate 104, 204, 304. As shown in FIG. 10, top portions of vertical guides 106, 206, 306 may comprise threaded openings and step 402 may comprise bolting the top portions of vertical guides 105, 205, 305 to assembly plate 104, 204, 304 by inserting bolts into the threaded openings of guides 105, 205, 305 through holes in plate 104, 204, 304 and tightening the bolts. Similar to above, the resulting attachment may comprise a full or partial moment connection operable to transfer bending moment forces between plate 104, 204, 304 and vertical guides 105, 205, 305.

Forming step 402 also may comprise attached horizontal guides 106, 206, 306 to motion assembly plate 104, 204, 304. As shown in FIG. 10, step 402 may comprise bolting rails 343, 347, 351 to motion assembly plate 304; bolting electric motors 345, 349, 353 to one end of rails 343, 347, 351; bolting one end of driveshafts 344, 348, 352 to the output shafts of motors 345, 349, 353; and movably attaching exterior surfaces of driveshafts 344, 348, 352 to interior surfaces of bearing blocks 346, 350, and 354. Step 402 may be similarly performed for apparatus 100 and 200.

Attaching step 403 may comprise attaching vertical actuators 230, 330, and 235, 335 to motion assembly plate 104, 204, 304. As shown in FIG. 11, step 403 may comprise dropping motors 331, 336 into a force transfer structure or socket; bolting one end of driveshafts 332, 337 to the output shafts of motors 331, 336; movably attaching exterior surfaces of driveshafts 332, 337 to interior surfaces of couplers (e.g., like couplers 233, 238 described above); inserting bottom ends of vertical guides 106, 206, 306 through openings of 3D print surface 107, 207, 307; and bolting the couplers (e.g., like couplers 233, 238) 3D print surface 107, 207, 307.

Aspects of steps 401, 402, and/or 403 of manufacturing method 400 may be similarly performed for motion isolation apparatus 100, 200, 300 with modification(s) for the different configurations and structures of apparatus 100, 200, 300 described herein.

Figure 6:
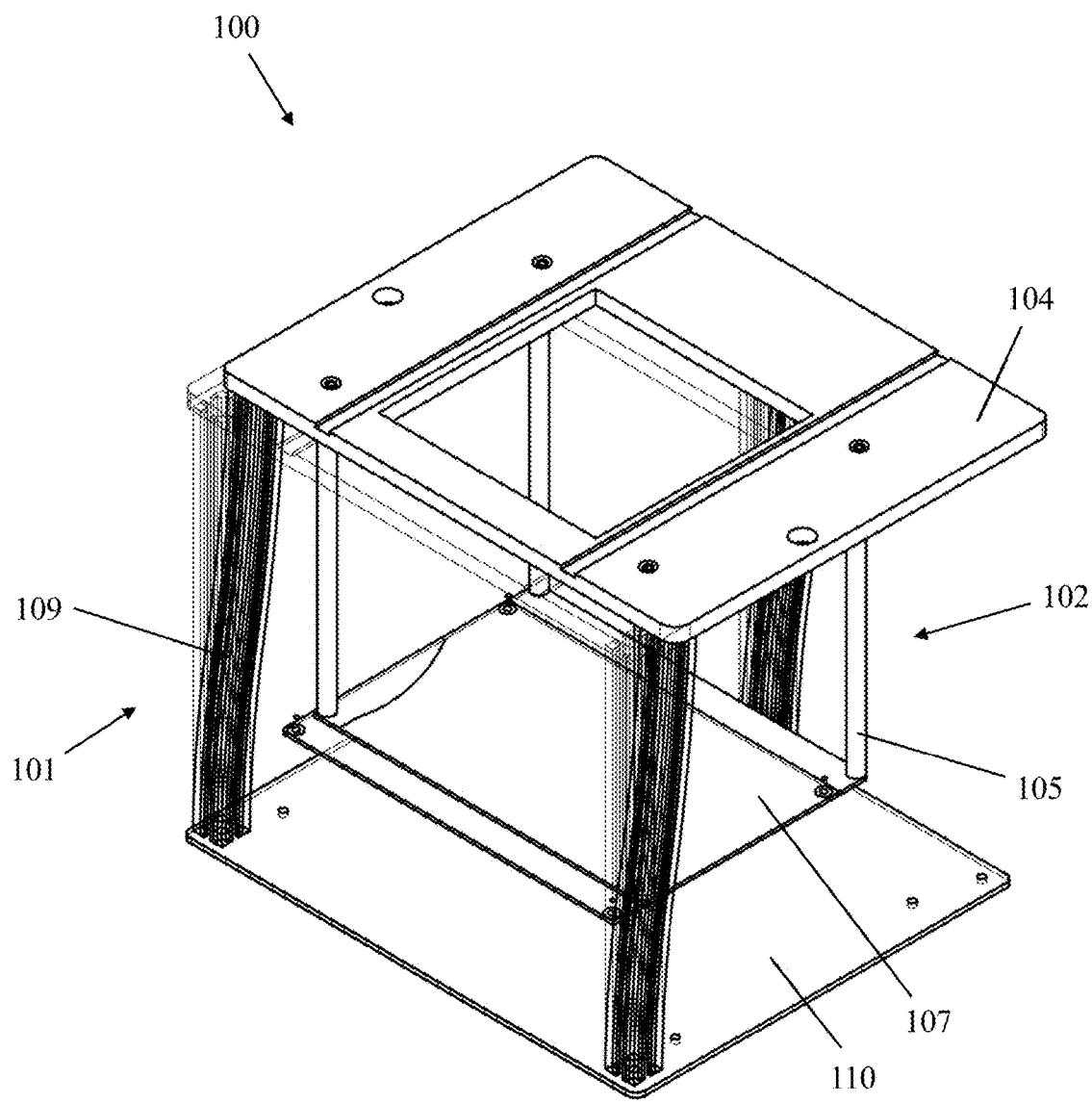
FIG. 6 depicts a perspective view of the FIG. 5 apparatus during operation.
Figure 6:
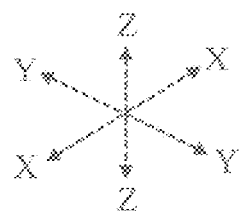

When manufactured according to method 400, floating frames 102, 202, 302 may be attached structural frames 101, 201, 301 with fixed connections (e.g., moment connections) or flexible connections (e.g., pinned connections). Because of their increased stiffness relative to structural frames 101, 201, 301, floating frames 102, 202, and 302 may be operable with structural frames 101, 201, and 301 to maintain an alignment between motion assembly plates 104, 204, and 304 and 3D print surfaces 107, 207, and 307 when 3D printing. In complement, because of their increased flexibility, portions of structural frames 101, 201, 301 (e.g., such as columns 109, 209, 309) may deflect elastically in a corresponding direction(s) responsive to reaction forces applied to motion assembly plates 104, 204, 304 during 3D printing. As shown in FIGS. 6, 9, and/or 12, the deflections of columns 109, 209, 309 may cause their respective floating frames 102, 202, 302 to move in different directions relative to the ground during 3D printing without disrupting the alignment between motion assembly plates 104, 204, 304 and 3D print surfaces 107, 207, 307. With motion isolation apparatus 100, 200, 300, the orientation of a 3D printhead relative to the ground or other support structure therefore may not matter while 3D printing because the alignment between motion assembly plates 104, 204, 304 with their respective 3D print surface 107, 207, 307 is reliably maintained.

When configured according to this disclosure, motion isolation apparatus 100, 200, 300 may be operable with any 3D printhead to print 3D models at higher print speeds and accelerations with fewer deflections or warping. As described herein, motion isolation apparatus 100, 200, 300 may be operable to realize head speeds of 1000 mm/s and accelerations of 10,000 mm/s². Even at these levels, because floating frames 102, 202, 302 are not rigidly attached to the ground, reaction forces applied to motion assembly plates 104, 204, 304 by accelerating a 3D printhead may cause elements of floating frames 102, 202, 302 to move together in space as one rather than deflect away from each other. A benefit of motion isolation apparatus 100, 200, 300 is thus that 3D printing errors caused by displacements between motion assembly plates 104, 204, and 304 relative their respective 3D print surfaces 107, 207, and 307 are diminished greatly at head speeds and accelerations that are exponentially greater than those of standard gantry 3D printers.

Benefits of motion isolation apparatus 100, 200, 300 may be demonstrated with mechanical vibrations analysis by modeling apparatus 100, 200, 300 as a mass-spring system with two degrees of freedom, in which the key variables are: $m_1$, the mass of structural frame 101, 201, 301; $k_1$, spring constant (i.e. stiffness) of the Z-axis and structural frame 101, 201, 301; $x_1$, the displacement of the structural frame 101, 201, 301; $m_2$, the mass of floating frame 102, 202, 302; $k_2$, spring constant (i.e. stiffness) of the Z-axis and floating frame 102, 202, 302; and f(t), the reaction force from accelerating the 3D printhead.

For simplicity, it may be assumed that 3D print surface 107, 207, 307 is fully lowered and supporting a heavy 3D model, results in the lowest-possible value for $k_2$ and the highest possible value for $m_2$. In this example, f(t) may be some nonlinear function determined by a motion planner such as a sum of harmonic motions $f(t)=A_1 \cos(\omega_1 t+\phi_1)+A_2 \cos(\omega_2 t+\phi_2)+ \ldots$, structural frame 101, 201, 301 may have a natural frequency $\omega_{n1}=\sqrt{(k_1/(m_1+m_2))}$, and floating frame 102, 202, 302 may have a natural frequency $\omega_{n2}=\sqrt{(k_2/m_2)}$. Displacements between the 3D printhead and 3D print surface 107, 207, 307 or "displacement errors" may be calculated as $\Delta x=|x_2-x_1|$, the effects of which may appear as dimensional inaccuracies and poor surface finishes.

Large displacement errors may be observed when a large component of f(t) oscillates at or near $\omega_{n1}$, such as when $x_1$ oscillates to a significant degree. The same is true for $\omega_{n2}$ and $x_2$. Appreciable negative effects may result, such as significant dimensional inaccuracies. Accordingly, if a floating frame stiffness of floating frame 102, 202, 302 (e.g., $k_2$) is greater than a structural frame stiffness of structural frame 101, 201, 301 (e.g., $k_1$), then $\omega_{n2}$ may be much greater than $\omega_{n1}$, allowing apparatus 100, 200, 300 to operate at or near $\omega_{n2}$ without causing large displacement errors. In practice coni is now minimally relevant to the performance of apparatus 100, 200, 300.

This analysis further demonstrates that the performance of motion isolation apparatus 100, 200, 300 may be improved at lower costs while reducing its overall weight. Compared to standard gantry 3D printers, a 3D printing system utilizing motion isolation apparatus 100, 200, 300 may thus be cheaper to build, cheaper to delivery, and faster. For example, in contrast to the standard gantry 3D printers shown in FIGS. 1-4, most of which utilize heavy materials to limit deflections, motion isolation apparatus 100, 200, 300 may be constructed from lightweight materials (e.g., hollow steel shapes, aluminum structures, and/or 3D printed polymers). Once constructed and operational, the reduced weight of a 3D printing system utilizing motion isolation apparatus 100, 200, and 300 also may allow for installations in locations that are not otherwise accessible via forklifts, pallet jacks, or cranes, adding versatility.

Exemplary aspects of motion isolation apparatus, methods, and systems have been described in relation to motion isolation apparatus 100, 200, and 300 and manufacturing method 400. It is contemplated that motion isolation apparatus 100, 200, and/or 300 may be sold separately or as part of a related method, kit, or system including other 3D printing elements. As shown in FIGS. 5 and 6, motion isolation apparatus 100 may be a sold without any electro-mechanical actuators so that buyer may customize as needed with available hardware. As shown in FIGS. 7-9 and 10-12, motion isolation apparatus 200 and 300 may be sold together with one or more electromechanical actuators and related hardware as part of a 3D printing kit or system. As shown in FIG. 13, structural frame 301 and floating frame 302 of motion isolation apparatus 300 also may be sold without any electro-mechanical actuators so that buyer may customize as needed.

Figure 15:
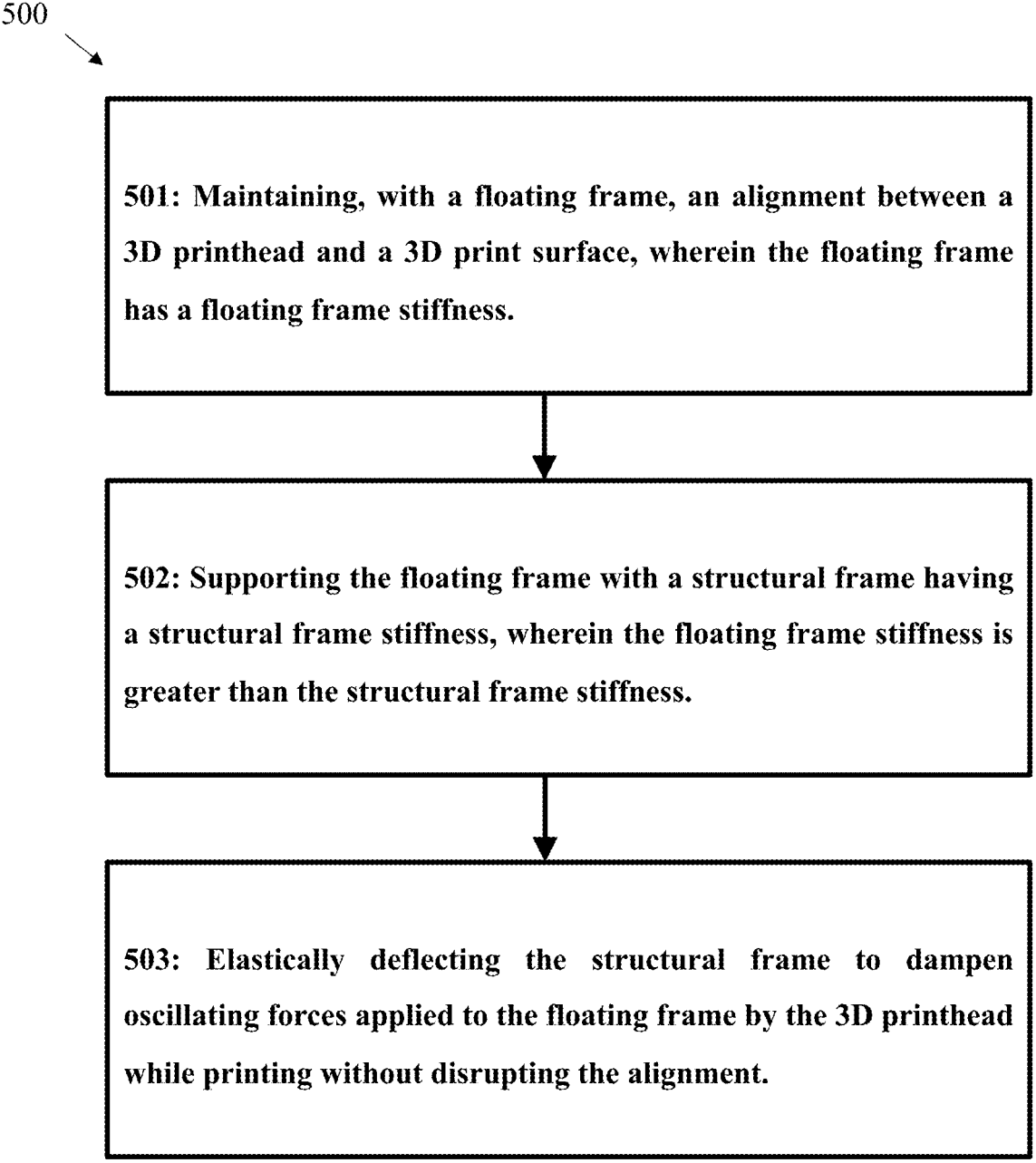
FIG. 15 depicts an exemplary motion isolation method.

As shown in FIG. 15, aspects of motion isolation apparatus 100, 200, and 300 also may be described in relation to a motion isolation method 500 comprising maintaining, with a floating frame 102, 202, 302, an alignment between a 3D printhead and a 3D print surface 107, 207, 307, wherein floating frame 102, 202, 302 has a floating frame stiffness (a maintaining step 501); supporting floating frame 102, 202, 302 with a structural frame 101, 201, 301 having a structural frame stiffness, wherein the floating frame stiffness is greater than the structural frame stiffness (a supporting step 502); and elastically deflecting structural frame 101, 201, 301 to dampen oscillating forces applied to floating frame 102, 202, 302 by the 3D printhead without disrupting the alignment (a dampening step 503).

Aspects of motion isolation method 500 may be modified as needed to accommodate different configurations of motion isolation apparatus 100, 200, and 300. For example, motion isolation method 500 may comprise additional steps for performing any functions described above with reference to aspects of motion isolation apparatus 100, 200, and 300 and/or method 400.

While principles of the present disclosure are described herein with reference to illustrative aspects for particular applications, the disclosure is not limited thereto. Those having ordinary skill in the art and access to this disclosure will recognize additional modifications, applications, aspects, and substitution of equivalents all fall in the scope of the described aspects. Accordingly, the present disclosure is not to be considered as limited by the foregoing description.

The invention claimed is:

1. A motion isolation apparatus comprising:
   a 3D printhead;
   a 3D print surface that is vertically movable between a plurality of different elevations relative to the 3D printhead;
   a floating frame that maintains an alignment between the 3D printhead and the 3D print surface at each elevation of the plurality of different elevations, the floating frame comprising vertical guides that are rigidly attached to the floating frame and operable to guide vertical movements of the 3D print surface between the plurality of different elevations, the floating frame having a floating frame stiffness; and
   a structural frame that supports the floating frame and has a structural frame stiffness,
   the floating frame stiffness being greater than the structural frame stiffness so that the structural frame elastically deflects to dampen oscillating forces applied to the floating frame by the 3D printhead during printing without disrupting the alignment.

2. The apparatus of claim 1, comprising horizontal guides that are removably attachable to the 3D printhead and operable to transfer the oscillating forces from the 3D printhead to the floating frame.

3. The apparatus of claim 2, wherein the horizontal guides are rigidly attached to the floating frame.

4. The apparatus of claim 3, wherein the floating frame comprises an opening sized to receive the 3D printhead.

5. The apparatus of claim 4, wherein the horizontal guides are adjacent the opening.

6. The apparatus of claim 1, wherein first ends of the vertical guides are rigidly attached to the floating frame with connections that are operable to transfer bending moment forces between the floating frame and the vertical guides.

7. The apparatus of claim 6, wherein the vertical guides elastically deflect responsive to the oscillating forces without disrupting the alignment.

8. The apparatus of claim 6, wherein bottom ends of the vertical guides are deflectable relative to the top ends of the vertical guides.

9. The apparatus of claim 6, comprising a bottom plate attached to bottom ends of the vertical guides.

10. The apparatus of claim 1, wherein the 3D print surface comprises sleeves that interact with the vertical guides to guide the vertical movements of the print surface.

11. The apparatus of claim 10, wherein exterior surfaces of the vertical guides interact with interior surfaces of the sleeve to guide the vertical movements.

12. The apparatus of claim 1, wherein the 3D print surface comprises a kinematic mount.

13. The apparatus of claim 1, wherein the floating frame is flexibly attached to the structural frame.

14. The apparatus of claim 1, wherein the floating frame is rigidly attached to the structural frame.

15. The apparatus of claim 14, wherein the structural frame comprises columns that are attached to the floating frame and operable to dampen the oscillating forces by deflecting elastically.

16. The apparatus of claim 15, wherein:
top ends of the columns are attached to the 3D printer attachment plate with rigid connections operable to transfer bending moment forces between the floating frame; and
the oscillating forces generate bending moments causing the columns to deflect elastically.

17. The apparatus of claim 15, comprising a base plate attached to bottom ends of the columns.

18. A motion isolation apparatus comprising:
a floating frame that maintains an alignment between a 3D printhead and a 3D print surface that is vertically movable between a plurality of different elevations relative to the 3D printhead, the floating frame comprising vertical guides that are rigidly attached to the floating frame and operable to guide vertical movements of the 3D print surface between the plurality of different elevations and maintain the alignment at each elevation of the plurality of different elevations, the floating frame having a floating frame stiffness; and
a structural frame that supports the floating frame and has a structural frame stiffness, the floating frame stiffness being greater than the structural frame stiffness so that the structural frame elastically deflects to dampen oscillating forces applied to the floating frame by the 3D printhead during printing without disrupting the alignment.

19. A motion isolation apparatus comprising:
a 3D print surface that is vertically movable between a plurality of different elevations relative to a 3D printhead;
a floating frame that maintains an alignment between the 3D printhead and the 3D print surface at each elevation of the plurality of different elevations, the floating frame comprising vertical guides that are rigidly attached to the floating frame and operable to guide vertical movements of the 3D print surface between the plurality of different elevations, the floating frame having a floating frame stiffness; and
a structural frame that supports the floating frame and has a structural frame stiffness, the floating frame stiffness being greater than the structural frame stiffness so that the structural frame elastically deflects to dampen oscillating forces applied to the floating frame by the 3D printhead during printing without disrupting the alignment.

20. The apparatus of claim 19, comprising the 3D printhead.

* * * * *